United States Patent
Ohishi et al.

(10) Patent No.: US 10,913,895 B2
(45) Date of Patent: Feb. 9, 2021

(54) LIQUID CRYSTAL COMPOSITION AND LIQUID CRYSTAL DISPLAY DEVICE

(71) Applicant: DIC Corporation, Tokyo (JP)

(72) Inventors: Haruki Ohishi, Kita-adachi-gun (JP); Kenzo Takeishi, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 35 days.

(21) Appl. No.: 15/735,378

(22) PCT Filed: Jun. 28, 2016

(86) PCT No.: PCT/JP2016/069098
§ 371 (c)(1),
(2) Date: Dec. 11, 2017

(87) PCT Pub. No.: WO2017/002792
PCT Pub. Date: Jan. 5, 2017

(65) Prior Publication Data
US 2018/0171229 A1    Jun. 21, 2018

(30) Foreign Application Priority Data

Jul. 2, 2015  (JP) .................................. 2015-133582

(51) Int. Cl.
| | | |
|---|---|---|
| C09K 19/24 | (2006.01) | |
| C09K 19/30 | (2006.01) | |
| C09K 19/34 | (2006.01) | |
| G02F 1/00 | (2006.01) | |
| C09K 19/18 | (2006.01) | |
| C09K 19/54 | (2006.01) | |
| C09K 19/46 | (2006.01) | |
| G02F 1/1335 | (2006.01) | |
| G02F 1/1337 | (2006.01) | |
| C09K 19/12 | (2006.01) | |
| G02F 1/29 | (2006.01) | |
| C09K 19/20 | (2006.01) | |

(52) U.S. Cl.
CPC .............. *C09K 19/24* (2013.01); *C09K 19/18* (2013.01); *C09K 19/3059* (2013.01); *C09K 19/3068* (2013.01); *C09K 19/3458* (2013.01); *C09K 19/46* (2013.01); *C09K 19/54* (2013.01); *G02F 1/0045* (2013.01); *G02F 1/133526* (2013.01); *G02F 1/133788* (2013.01); *C09K 2019/123* (2013.01); *C09K 2019/181* (2013.01); *C09K 2019/2035* (2013.01); *C09K 2019/2092* (2013.01); *C09K 2019/301* (2013.01); *C09K 2019/3004* (2013.01); *C09K 2019/3063* (2013.01); *C09K 2019/3078* (2013.01); *G02F 2001/294* (2013.01)

(58) Field of Classification Search
CPC ..................................................... C09K 19/32
See application file for complete search history.

(56) References Cited

U.S. PATENT DOCUMENTS

| | | | |
|---|---|---|---|
| 6,096,242 A | 8/2000 | Hachiya et al. | |
| 2007/0071911 A1* | 3/2007 | Takaku | C09K 19/02 428/1.1 |
| 2013/0235290 A1* | 9/2013 | Takezoe | C09K 19/02 349/33 |
| 2015/0085214 A1* | 3/2015 | Hayashi | G02F 1/1343 349/15 |

FOREIGN PATENT DOCUMENTS

| | | |
|---|---|---|
| JP | H10-08056 A | 1/1998 |
| JP | 2011-236178 A | 11/2011 |
| JP | 2011236178 A * | 11/2011 |
| JP | 2013-103897 A | 5/2013 |
| JP | 2013-185110 A | 9/2013 |
| JP | 2014-062185 A | 4/2014 |
| JP | 2015-84077 A | 4/2015 |
| WO | 2005/042670 A1 | 5/2005 |

OTHER PUBLICATIONS

International Search Report dated Sep. 13, 2016, issued in counterpart International Application No. PCT/JP2016/069098 (2 pages).
Office Action dated Mar. 12, 2020, issued in counterpart JP application No. 2017-211796, with English translation. (6 pages).
Office Action dated Sep. 5, 2017, issued in counterpart JP application No. 2017-10163, with English translation. (85 pages).

* cited by examiner

*Primary Examiner* — Chanceity N Robinson
(74) *Attorney, Agent, or Firm* — Westerman, Hattori, Daniels & Adrian, LLP

(57) ABSTRACT

A composition having a high Δn, a wide temperature range of a liquid crystal phase, low viscosity, good solubility at a low temperature, high resistivity, a high voltage holding ratio, and stability against heat and light; a liquid crystal composition containing the composition, the liquid crystal composition having a good lens effect and good chemical stability; a liquid crystal display device including the liquid crystal composition; and a liquid crystal lens including the liquid crystal composition. The liquid crystal composition contains one or two or more compounds represented by general formula (i) and one or two or more compounds represented by general formula (ii).

10 Claims, No Drawings

LIQUID CRYSTAL COMPOSITION AND LIQUID CRYSTAL DISPLAY DEVICE

TECHNICAL FIELD

The present invention relates to a composition useful for organic electronic materials and medical and agricultural chemicals, in particular, useful as a liquid crystal material for electro-optic liquid crystal displays and as a liquid crystal material for liquid crystal lenses, the composition having a positive dielectric anisotropy ($\Delta\varepsilon$), and a liquid crystal display device including the composition.

BACKGROUND ART

Liquid crystal display devices are used in, for example, timepieces, electronic calculators, various measuring instruments, automotive panels, word processors, electronic notepads, printers, computers, television sets, timepieces, and advertisement display boards. Typical examples of a liquid crystal display mode include a twisted nematic (TN) mode, a super-twisted nematic (STN) mode, a vertical alignment (VA) mode including thin-film transistors (TFT), and an in-plane switching (IPS) mode. In recent years, there has been a trend toward reductions in cell gaps (d) of liquid crystal cells in these liquid crystal display devices to achieve faster operation. Here, there is a constraint that the value (retardation) of the product (d×$\Delta$n) of the cell gap and the refractive index anisotropy ($\Delta$n) must be optimized. Thus, when the cell gap is reduced (d is reduced), the value of $\Delta$n must be increased. As just described, a higher $\Delta$n value of a liquid crystal composition is required. To this end, a liquid crystal compound having a larger $\Delta$n value than existing liquid crystal compounds is required. Also from the viewpoint of improving the contrast of liquid crystal display devices, a liquid crystal composition having a large $\Delta$n value is required.

Examples of application devices including liquid crystal compositions include liquid crystal lenses using the birefringence of liquid crystal materials. Liquid crystal lenses are used as, for example, switchable 2D/3D lenses and focusing lenses for cameras.

In each of the lenses, the lens function is provided by applying a voltage to a liquid crystal composition that is enclosed between glass or film substrates and that is subjected to orientation treatment with alignment layers to change the orientation of the liquid crystal composition and to change the refractive index of the liquid crystal material.

Examples of substrates in which liquid crystal materials are enclosed include a pair of common planar substrates and a pair of substrates in which one substrate is processed in lens form. In the case of a pair of planar substrates, by the application of an electric field using electrodes designed to arrange liquid crystal molecules enclosed in the substrates in lens form, incident light passing through the substrates is refracted through a liquid crystal layer arranged in lens form, despite the use of the planar substrates (PTL 1).

In the case where liquid crystal lenses are used for 3D applications, left and right images can be identified by the left and right eyes by the use of the refraction of light through the liquid crystal lenses and binocular disparity and thus can be recognized as a three-dimensional object.

In the case where liquid crystal lenses are used as focusing lenses for cameras, the refractive index is changed by changing the intensity of the applied voltage, thereby adjusting the focal length.

In such a liquid crystal lens, if the refractive index is largely changed as the orientation of a liquid crystal composition used therefor is changed, a desired lens effect is provided in a thin cell; thus, the liquid crystal composition used therefor is required to have an unprecedented high birefringence ($\Delta$n). However, it is difficult to obtain a required $\Delta$n value in the first place. Furthermore, it is extremely difficult to develop a liquid crystal composition having a required $\Delta$n value and other physical properties, such as the temperature range of a liquid crystal phase and viscosity, sufficient for practical use.

CITATION LIST

Patent Literature

PTL 1: Japanese Unexamined Patent Application Publication No. 2015-84077

SUMMARY OF INVENTION

Technical Problem

The present invention aims to provide a composition having a high $\Delta$n, a wide temperature range of a liquid crystal phase, low viscosity, good solubility at a low temperature, high resistivity, a high voltage holding ratio, and stability against heat and light; a liquid crystal composition containing the composition, the liquid crystal composition having good contrast characteristics for liquid crystal display devices; a liquid crystal composition having a good lens effect and good chemical stability; a liquid crystal display device including the liquid crystal composition; and a liquid crystal lens including the liquid crystal composition.

Solution to Problem

To solve the foregoing problems, the inventors have conducted studies on the syntheses of various compounds and have found that a compound including both an azobenzene moiety and a tolan moiety is effective in solving the problems. This finding has led to the completion of the present invention.

The present invention provides a liquid crystal composition, a liquid crystal display device including the liquid crystal composition, a liquid crystal lens including the liquid crystal composition, and a birefringent lens including the liquid crystal composition, the birefringent lens being used for displaying a stereoscopic image, the liquid crystal composition containing one or two or more compounds represented by general formula (i):

[Chem. 1]

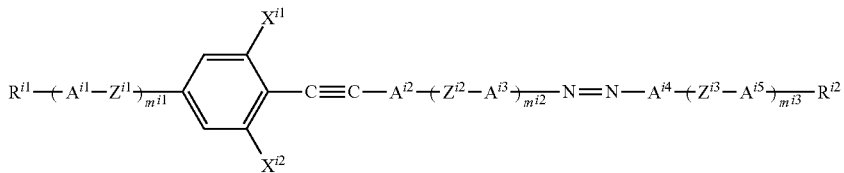

(i)

(where in the formula, $R^{i1}$ and $R^{i2}$ each independently represent a fluorine atom, a chlorine atom, a cyano group or an alkyl group having 1 to 12 carbon atoms, one —CH$_2$— group or two or more non-adjacent —CH$_2$— groups in the alkyl group are each independently optionally replaced with —CH=CH—, —C≡C—, —O—, —CO—, —COO—, or OCO—, one or two or more hydrogen atoms present in each of $R^{i1}$ and $R^{i2}$ are each independently optionally replaced with a fluorine atom, provided that either $R^{i1}$ or $R^{i2}$, but not both, optionally represents a substituent selected from a fluorine atom, a chlorine atom, and a cyano group, $Z^{i1}$, $Z^{i2}$, and $Z^{i3}$ each independently represent a single bond, —OCH$_2$—, —CH$_2$O—, —C$_2$H$_4$—, —C$_4$H$_8$—, —COO—, —OCO—, —CH=CH—, —CF=CF—, —CF$_2$O—, —OCF$_2$—, —CF$_2$CF$_2$—, or —C≡C—, $A^{i1}$, $A^{i2}$, $A^{i3}$, $A^{i4}$, and $A^{i5}$ each independently represent a 1,4-cyclohexylene group, a 1,4-phenylene group, a naphthalene-1,4-diyl group, or a naphthalene-2,6-diyl group, one or two or more hydrogen atoms in $A^{i1}$, $A^{i2}$, $A^{i3}$, $A^{i4}$ and $A^{i5}$ are each independently optionally replaced with a halogen atom or a cyano group, one or more non-adjacent —CH= groups in $A^{i1}$, $A^{i2}$, $A^{i3}$, $A^{i4}$ and $A^{i5}$ are optionally replaced with —N=, $X^{i1}$ and $X^{i2}$ each independently represent a hydrogen atom or a fluorine atom, and $m^{i1}$, $m^{i2}$, and $m^{i3}$ each independently represent 0 or 1, provided that $m^{i1}+m^{i2}+m^{i3}$ is 0 or 1); and one or two or more compounds represented by general formulae (C1) to (C3):

[Chem. 2]

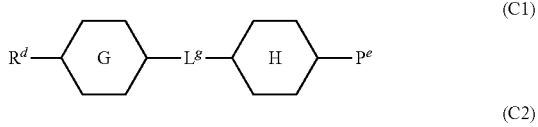

(C1)

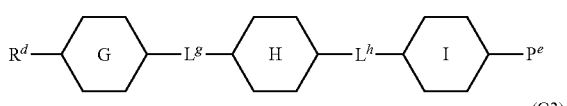

(C2)

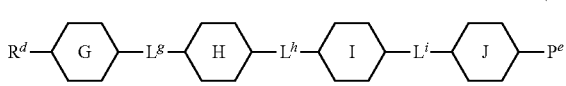

(C3)

(where in the formulae, $R^d$ and $P^e$ each independently represent an alkyl group having 1 to 12 carbon atoms, each of $R^d$ and $P^e$ is optionally straight-chained, optionally contains a methyl or ethyl branch, and optionally has a 3- to 6-membered ring structure, any —CH$_2$— present in the group is optionally replaced with —O—, —CH=CH—, —CH=CF—, —CF=CH—, —CF=CF—, or —CC—, any hydrogen atom present in the group is optionally replaced with a fluorine atom or a trifluoromethoxy group, ring G, ring H, ring I, and ring J each independently represent a trans-1,4-cyclohexylene group, a trans-decahydronaphthalene-trans-2,6-diyl group, a 1,4-phenylene group optionally substituted with one or two fluorine atoms or a methyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with one or two fluorine atoms, a 1,3-dioxane-trans-2,5-diyl group, a pyrimidine-2,5-diyl group, or a pyridine-2,5-diyl group, $L^g$, $L^h$, and $L^i$ each independently represent a single bond, an ethylene group (—CH$_2$CH$_2$—), a 1,2-propylene group (—CH(CH$_3$)CH$_2$— or) —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH—, and when the compounds represented by general formulae (C1) to (C3) are used in combination, identical moieties (such as ring G or $L^g$) in different molecules optionally represent identical substituents or different substituents).

Advantageous Effects of Invention

The liquid crystal composition that is provided by the present invention and that contains the compounds represented by general formulae (i) and (C1) to (C3) is stable against heat, light, and so forth, can be easily industrially produced, and has a significantly high Δn, low viscosity, and a wide temperature range of a liquid crystal phase.

Thus, the liquid crystal composition is very useful as a liquid crystal material for a liquid crystal lens required to have a high Δn.

DESCRIPTION OF EMBODIMENTS

The compounds represented by formula (i) may be used alone or in combination of two or more.

If the content of the compound represented by general formula (i) in the liquid crystal composition of the present invention is low, the effect thereof is not provided. Thus, the lower limit in the composition is preferably 1% by mass (hereinafter, % in the composition indicates % by mass), preferably 2%, preferably 5%, preferably 7%, preferably 9%, preferably 10%, preferably 12%, preferably 15%, preferably 17%, preferably 20%. If the content is high, problems such as precipitation arise. Thus, the upper limit is preferably 50%, more preferably 40%, more preferably 30%, preferably 25%, preferably 20%, preferably 18%, preferably 15%, preferably 13%, preferably 10%.

In general formula (i), $R^{i1}$ preferably represents an alkyl group having 1 to 8 carbon atoms, an alkoxy group having 1 to 8 carbon atoms, an alkenyl group having 2 to 8 carbon atoms, an alkenyloxy group having 2 to 8 carbon atoms, preferably an alkyl group having 1 to 5, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, more preferably an alkyl group having 2 to 5 carbon atoms or an alkenyl group having 2 to 3 carbon atoms.

When importance is placed on reliability, an alkyl group is preferred. When importance is placed on a reduction in viscosity, an alkenyl group is preferred.

When a ring structure to which $R^{i1}$ is bonded is a phenyl group (aromatic group), $R^{i1}$ preferably represents a linear alkyl group having 1 to 5 carbon atoms, a linear alkoxy group having 1 to 4 carbon atoms, or an alkenyl group having 4 to 5 carbon atoms. When a ring structure to which $R^{i1}$ is bonded is a saturated ring structure such as cyclohexane, pyrane, or dioxane, $R^{i1}$ preferably represents a linear alkyl group having 1 to 5, a linear alkoxy group having 1 to 4, or a linear alkenyl group having 2 to 5 carbon atoms. To stabilize a nematic phase, the number of carbon atoms and, if present, oxygen atoms, is preferably 5 or less in total, and $R^{i1}$ is preferably straight-chained.

The alkenyl group is preferably selected from groups represented by formulae (R1) to (R5) (a black spot in each of the formulae represents a carbon atom in the ring structure).

[Chem. 3]

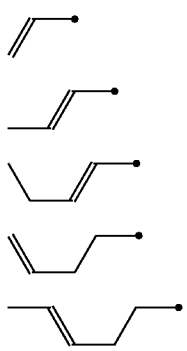

(R1)

(R2)

(R3)

(R4)

(R5)

$R^{i2}$ preferably represents a fluorine atom, a cyano group, a trifluoromethyl group or a trifluoromethoxy group, preferably a fluorine atom or a cyano group when the compound represented by general formula (i) is what is called a p-type compound, which has a positive dielectric anisotropy Δε.

When the compound represented by general formula (i) is what is called a non-polar compound, which has a dielectric anisotropy Δε of about 0, $R^{i2}$ represents the same meaning as $R^{i1}$, and $R^{i2}$ and $R^{i1}$ may be the same or different.

$A^{i1}$ to $A^{i5}$ each independently preferably represent an aromatic group when Δn is required to be increased, preferably an aliphatic group in order to improve the response speed. $A^{i1}$ to $A^{i5}$ each independently preferably represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably a structure selected from those illustrated below:

[Chem. 4]

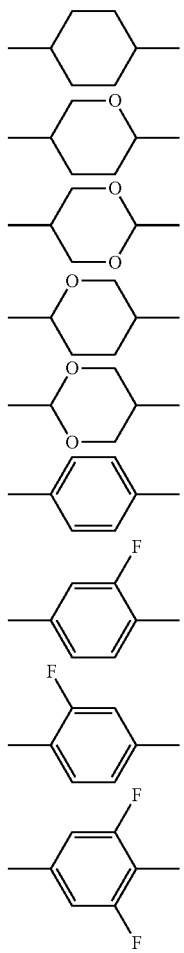

$A^{i1}$ to $A^{i5}$ each independently preferably represent a 1,4-phenylene group in which one or two or more hydrogen atoms may be replaced with a fluorine atom.

$Z^{i1}$ to $Z^{i3}$ each preferably represent a single bond.

$m^{i1}$ preferably represents 0 when importance is placed on solubility in the liquid crystal composition, preferably 1 when importance is placed on Δn and Tni.

At least one of $X^{i1}$ and $X^{i2}$ preferably represents a fluorine atom. Each of $X^{i1}$ and $X^{i2}$ preferably represents a fluorine atom.

$m^{i1}+m^{i2}+m^{i3}$ is preferably 0.

The compound represented by general formula (i) is preferably selected from compounds represented by general formulae (i-1) to (i-18):

[Chem. 5]

(i-1)

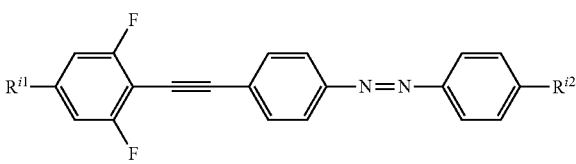

(i-2)
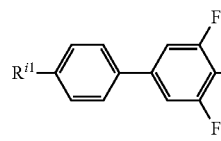
(i-3)
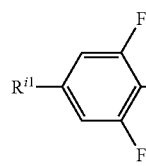
(i-4)
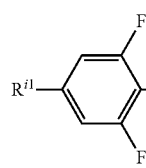
(i-5)
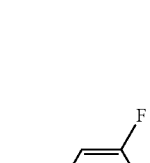
(i-6)
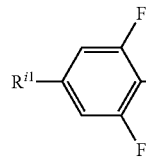
(i-7)
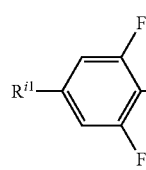
(i-8)
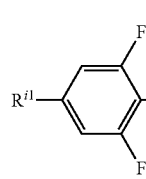
(i-9)
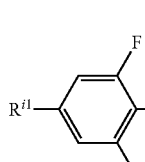
(i-10)
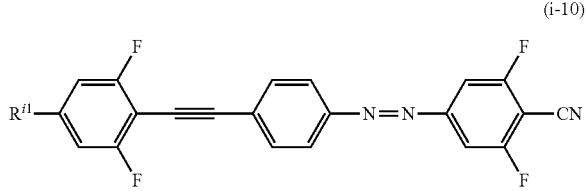
(i-11)
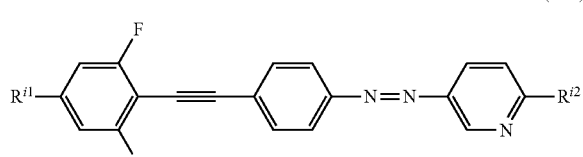
(i-12)
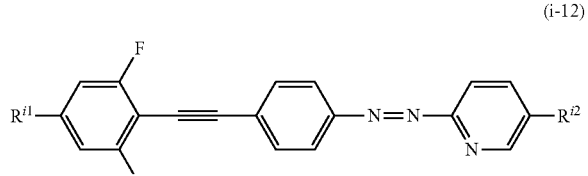
(i-13)
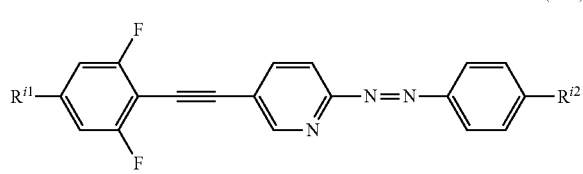
(i-14)
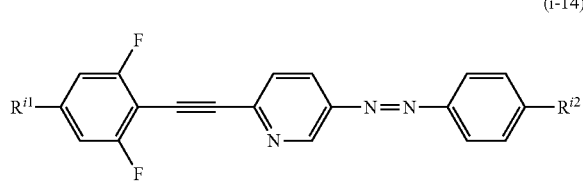
(i-15)
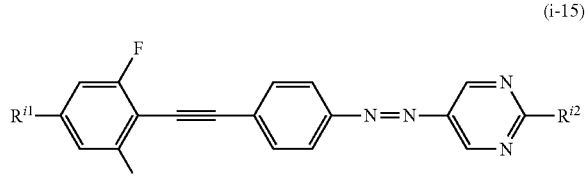
(i-16)
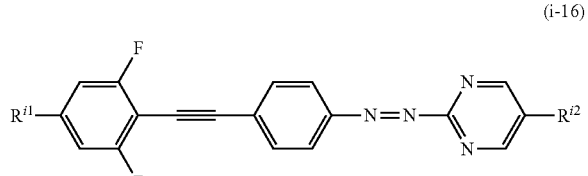
(i-17)
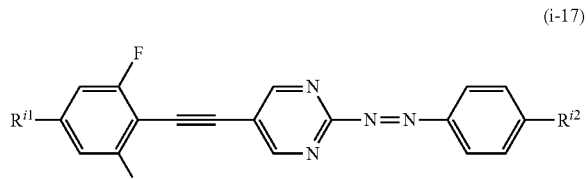

-continued (i-18)

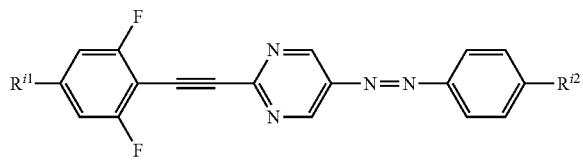

(where in the formulae, $R^{ii1}$ and $R^{ii2}$ each independently represent the same meanings as $R^{ii1}$ and $R^{ii2}$ in general formula (i)).

Compounds represented by general formulae (C1) to (C3) are what are called non-polar compounds, which have a dielectric anisotropy of about 0.

The compounds represented by general formulae (C1) to (C3) may be used alone or in combination of two or more.

If the contents of the compounds represented by general formulae (C1) to (C3) in the liquid crystal composition of the present invention are low, the effect thereof is not provided. Thus, the lower limit in the composition is preferably 1% by mass (hereinafter, % in the composition indicates % by mass), preferably 2%, preferably 5%, preferably 7%, preferably 9%, preferably 10%, preferably 12%, preferably 15%, preferably 17%, preferably 20%. If the contents are high, problems such as precipitation arise. Thus, the upper limit is preferably 50%, more preferably 40%, more preferably 30%, preferably 25%, preferably 20%, preferably 18%, preferably 15%, preferably 13%, preferably 10%.

[Chem. 6]

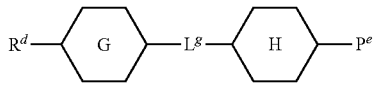
(C1)

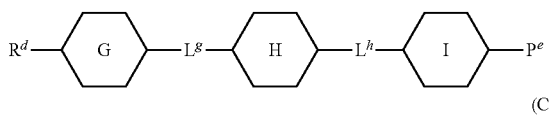
(C2)

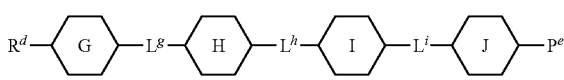
(C3)

In each of the formulae illustrated above, $R^d$ and $R^e$ each independently represent an alkyl group having 1 to 12 carbon atoms, each of $R^d$ and $R^e$ may be straight-chained, may contain a methyl or ethyl branch, and may have a 3- to 6-membered ring structure. Any —$CH_2$— present in the group may be replaced with —O—, —CH=CH—, —CH=CF—, —CF=CH—, —CF=CF—, or —C≡C—. Any hydrogen atom present in the group may be replaced with a fluorine atom or a trifluoromethoxy group. Each of $R^d$ and $R^e$ is preferably a linear alkyl group having 1 to 7 carbon atoms, a linear 1-alkenyl group having 2 to 7 carbon atoms, a linear 3-alkenyl group having 4 to 7 carbon atoms, a linear alkoxy group having 1 to 3 carbon atoms, or a linear alkyl group that has 1 to 5 carbon atoms and that has an end substituted with an alkoxy group having 1 to 3 carbon atoms. At least one of $R^d$ and $R^e$ particularly preferably represents a linear alkyl group having 1 to 7 carbon atoms, a linear 1-alkenyl group having 2 to 7 carbon atoms, or a linear 3-alkenyl group having 4 to 7 carbon atoms. When an asymmetric carbon atom is present due to the branch, the compound may be optically active or a racemate.

Ring G, ring H, ring I, and ring J each independently represent a trans-1,4-cyclohexylene group, a trans-decahydronaphthalene-trans-2,6-diyl group, a 1,4-phenylene group optionally substituted with one or two fluorine atoms or a methyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with a fluorine atom, a 1,3-dioxane-trans-2,5-diyl group, a pyrimidine-2,5-diyl group, or a pyridine-2,5-diyl group. In each of the compounds, the number of each of a trans-decahydronaphthalene-trans-2,6-diyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with a fluorine atom, a 1,3-dioxane-trans-2,5-diyl group, a pyrimidine-2,5-diyl group, and a pyridine-2,5-diyl group is preferably one or less. Each of the other rings is preferably a trans-1,4-cyclohexylene group or a 1,4-phenylene group optionally substituted with one or two fluorine atoms or a methyl group.

$L^g$, $L^h$, and $L^i$ are linking groups and each independently represent a single bond, an ethylene group (—$CH_2CH_2$—), a 1,2-propylene group (—$CH(CH_3)CH_2$— or) —$CH_2CH(CH_3)$—), a 1,4-butylene group, —COO—, —OCO—, —$OCF_2$—, —$CF_2O$—, —CH=CH—, —CH=CF—, —CF=CH—, —CF=CF—, —CmC—, or —CH=NN=CH—. Preferably, $L^g$, $L^h$, and $L^i$ each independently represent a single bond, an ethylene group, a 1,4-butylene group, —COO—, —OCO—, —$OCF_2$—, —$CF_2O$—, —CF=CF—, —CCC—, or —CH=NN=CH—. In (C2), at least one of $L^g$ and $L^h$ preferably represents a single bond. In (C3), preferably, at least two of $L^g$, $L^h$, and $L^i$ each represent a single bond.

When the compounds represented by general formulae (C1) to (C3) are used in combination, identical moieties (such as ring G or $L^g$) in different molecules may represent identical substituents or different substituents.

In general formulae (C1) to (C3), general formulae (A1) to (A3), (B1) to (B3), (i), and (ii) of the present invention are excluded.

Preferably, the lower limit of the contents of the compounds represented by general formulae (C1) to (C3) is 1%, 2%, 5%, 8%, 10%, 13%, 15%, 18%, 20%, 22%, 25%, or 30% with respect to the total amount of the composition of the present invention. Preferably, the upper limit of the contents is 30%, 28%, 25%, 23%, 20%, 18%, 15%, 13%, 10%, 8%, or 5%.

When the composition of the present invention is required to maintain low viscosity and to have a high response speed, preferably, the lower limit is low, and the upper limit is high. When the composition of the present invention is required to maintain a high Tni and to be less likely to cause image-sticking, preferably, the lower limit is high, and the upper limit is high. When a high dielectric anisotropy is required in order to maintain a low drive voltage, preferably, the lower limit is low, and the upper limit is low.

More preferred structures of (C1) can be represented by general formulae (C1a) to (C1h):

[Chem. 7]

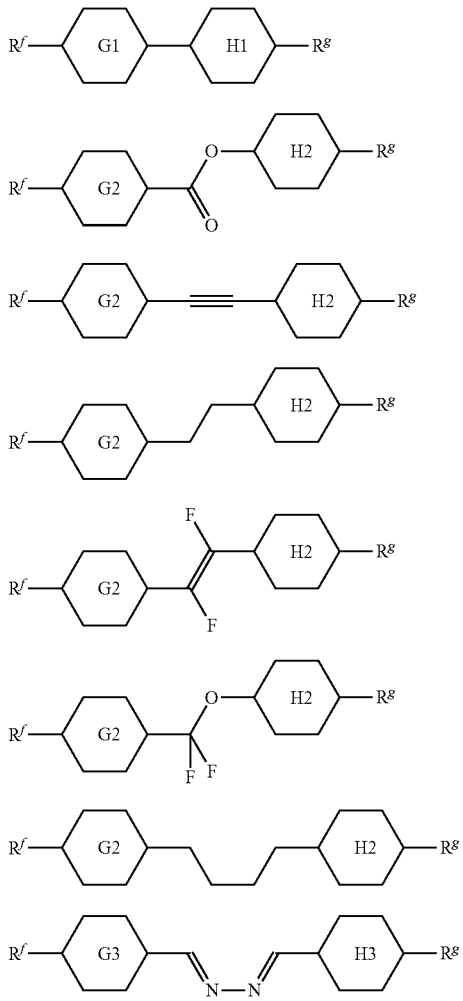

In each of the formulae illustrated above, R$^f$ and R$^g$ each independently represent a linear alkyl group having 1 to 7 carbon atoms, a linear 1-alkenyl group having 2 to 7 carbon atoms, a linear 3-alkenyl group having 4 to 7 carbon atoms, a linear alkoxy group having 1 to 3 carbon atoms, or a linear alkyl group that has 1 to 5 carbon atoms and that has an end substituted with an alkoxy group having 1 to 3 carbon atoms. At least one of R$^f$ and R$^g$ represents a linear alkyl group having 1 to 7 carbon atoms, a linear 1-alkenyl group having 2 to 7 carbon atoms, or a linear 3-alkenyl group having 4 to 7 carbon atoms. When rings G1 to G8 represent aromatic rings, a 1-alkenyl group and an alkoxy group are excluded from R$^f$. When rings H1 to H8 represent aromatic rings, a 1-alkenyl group and an alkoxy group are excluded from R$^g$.

Rings G1 and H1 each independently represent a trans-1,4-cyclohexylene group, a trans-decahydronaphthalene-trans-2,6-diyl group, a 1,4-phenylene group optionally substituted with one or two fluorine atoms or a methyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with one or two fluorine atoms, a 1,3-dioxane-trans-2,5-diyl group, a pyrimidine-2,5-diyl group, or a pyridine-2,5-diyl group. In each of the compounds, the number of each of a trans-decahydronaphthalene-trans-2,6-diyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with a fluorine atom, a 1,3-dioxane-trans-2,5-diyl group, a pyrimidine-2,5-diyl group, and a pyridine-2,5-diyl group is preferably one or less. In this case, the other ring is a trans-1,4-cyclohexylene group or a 1,4-phenylene group optionally substituted with one or two fluorine atoms or a methyl group. Rings G2 and H2 each independently represent a trans-1,4-cyclohexylene group, a trans-decahydronaphthalene-trans-2,6-diyl group, a 1,4-phenylene group optionally substituted with one or two fluorine atoms or a methyl group, a naphthalene-2,6-diyl group optionally substituted with one or more fluorine atoms, or a tetrahydronaphthalene-2,6-diyl group optionally substituted with one or two fluorine atoms. In each of the compounds, the number of each of a trans-decahydronaphthalene-trans-2,6-diyl group, a naphthalene-2,6-diyl group optionally substituted with one or more fluorine atoms, and a tetrahydronaphthalene-2,6-diyl group optionally substituted with one or two fluorine atoms is preferably one or less. In this case, the other ring is a trans-1,4-cyclohexylene group or a 1,4-phenylene group optionally substituted with one or two fluorine atoms or a methyl group. Rings G3 and H3 each independently represent a 1,4-phenylene group optionally substituted with one or two fluorine atoms or a methyl group, a naphthalene-2,6-diyl group optionally substituted with one or more fluorine atoms, or a tetrahydronaphthalene-2,6-diyl group optionally substituted with one or two fluorine atoms. In each of the compounds, the number of each of a naphthalene-2,6-diyl group optionally substituted with one or more fluorine atoms and a tetrahydronaphthalene-2,6-diyl group optionally substituted with one or two fluorine atoms is preferably one or less.

The following compounds are more preferred.

[Chem. 8]

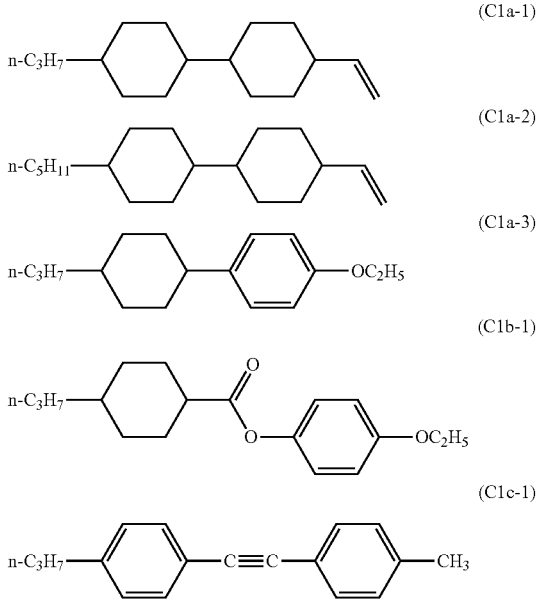

(C1c-2)
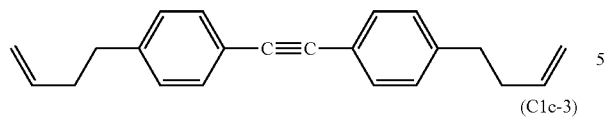

(C1c-3)
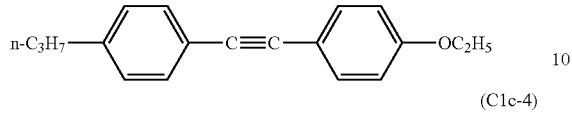

(C1c-4)
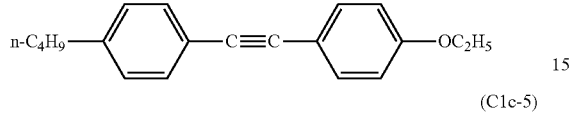

(C1c-5)
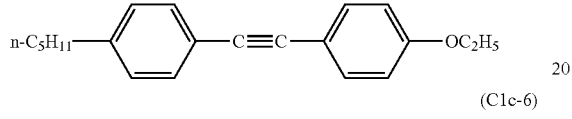

(C1c-6)
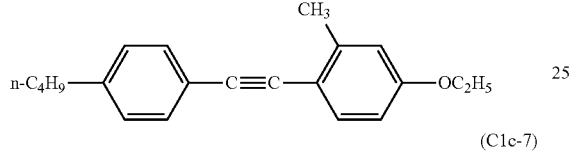

(C1c-7)
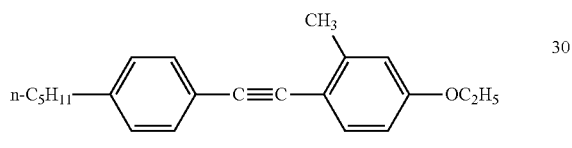

More preferred structures of (C2) can be represented by general formulae (C2a) to (C2m):

[Chem.9]

(C2a)
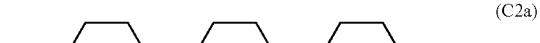

(C2b)
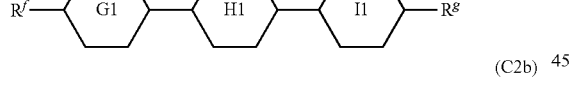

(C2c)
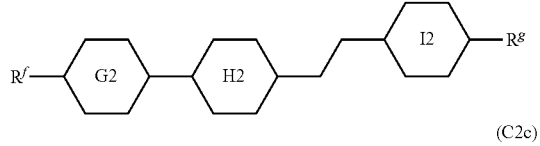

(C2d)
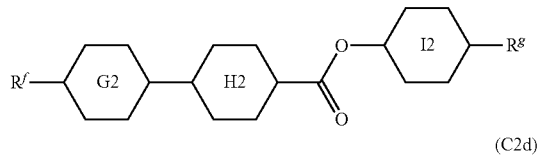

(C2e)
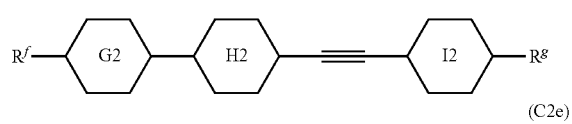

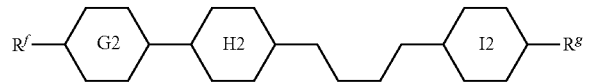

(C2f)
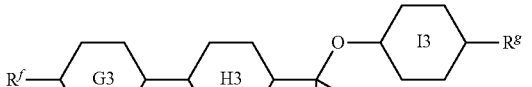

(C2g)

(C2h)
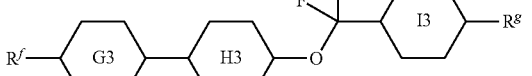

(C2i)
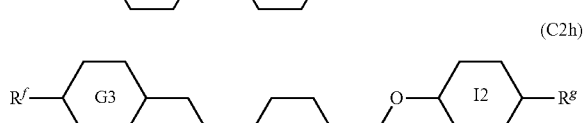

(C2j)
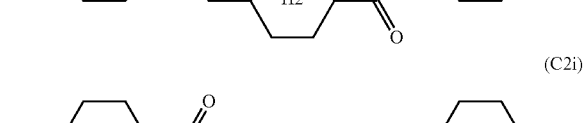

(C2k)
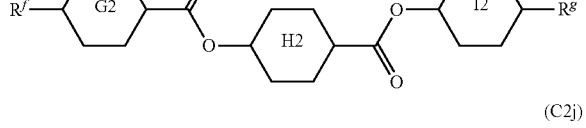

(C2l)
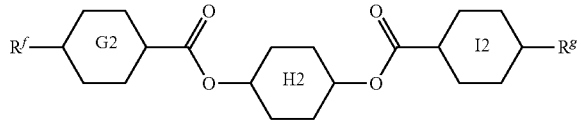

(C2m)
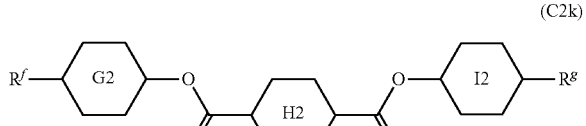

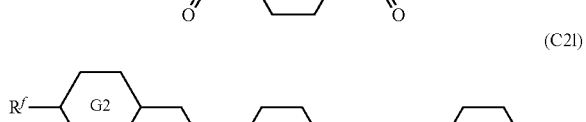

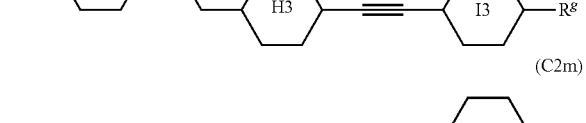

In the formulae illustrated above, rings G1, G2, G3, H1, H2, and H3 represent the same meanings as defined above. Ring I1 represents the same meaning as ring G1. Ring I2 represents the same meaning as ring G2. Ring I3 represents the same meaning as ring G3. In each of the compounds, the number of each of a trans-decahydronaphthalene-trans-2,6-diyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with a fluorine atom, a 1,3-dioxane-trans-2,5-diyl group, a pyrimidine-2,5-diyl group, and a pyridine-2,5-diyl group is preferably one or less. In this case, each of the other rings is a trans-1,4-cyclohexylene group or a 1,4-phenylene group optionally substituted with one or two fluorine atoms or a methyl group.

The following compounds are more preferred.

[Chem. 10]

(C2a-1)
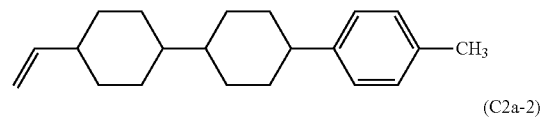

(C2a-2)
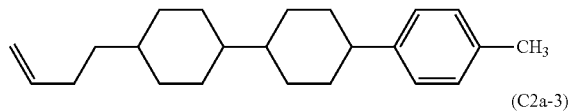

(C2a-3)
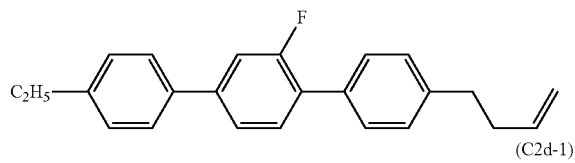

(C2d-1)
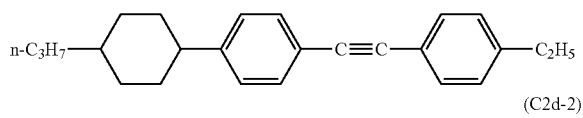

(C2d-2)
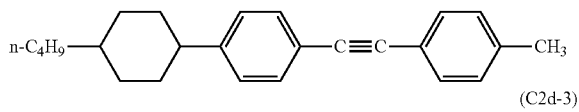

(C2d-3)
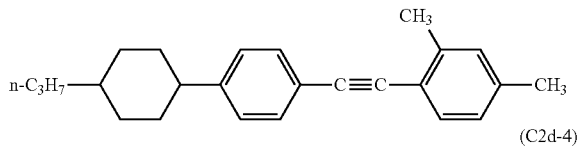

(C2d-4)
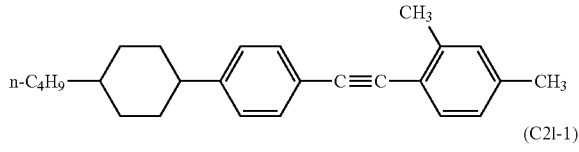

(C2l-1)
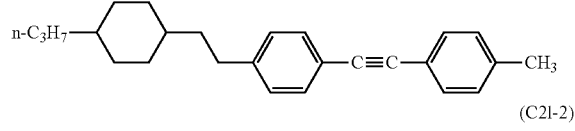

(C2l-2)
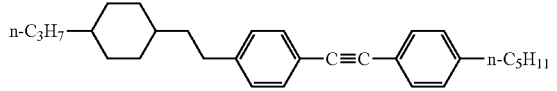

More preferred structures of (C3) can be represented by general formulae (C3a) to (C3f):

[Chem. 11]

(C3a)
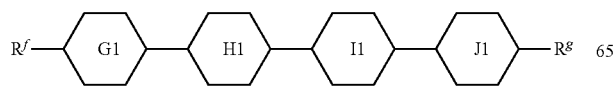

(C3b)
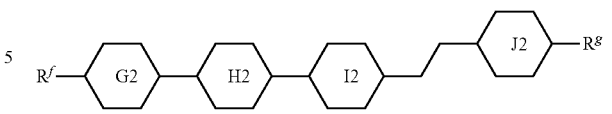

(C3c)

(C3d)
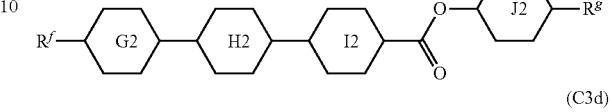

(C3e)
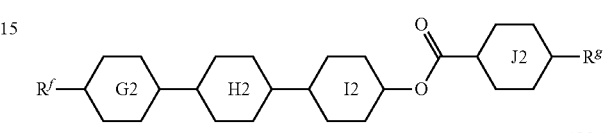

(C3f)
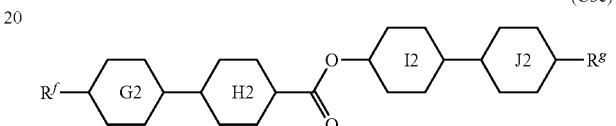

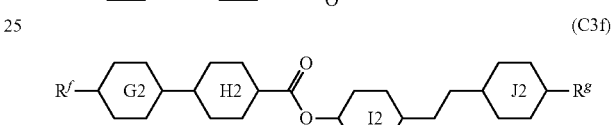

In the formulae illustrated above, rings G1, G2, H1, H2, I1, and I2 represent the same meanings as defined above. Ring J1 represents the same meaning as ring G1. Ring J2 represents the same meaning as ring G2. In each of the compounds, the number of each of a trans-decahydronaphthalene-trans-2,6-diyl group, a naphthalene-2,6-diyl group optionally substituted with one or more fluorine atoms, a tetrahydronaphthalene-2,6-diyl group optionally substituted with one or two fluorine atoms, a 1,4-cyclohexenylene group optionally substituted with a fluorine atom, a 1,3-dioxane-trans-2,5-diyl group, a pyrimidine-2,5-diyl group, and a pyridine-2,5-diyl group is preferably one or less. In this case, each of the other rings is a trans-1,4-cyclohexylene group or a 1,4-phenylene group optionally substituted with one or two fluorine atoms or a methyl group.

The following compounds are more preferred.

[Chem. 12]

(C3e-1)
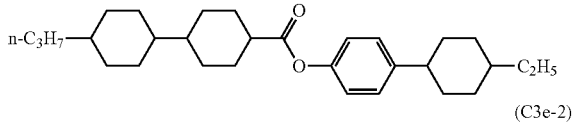

(C3e-2)
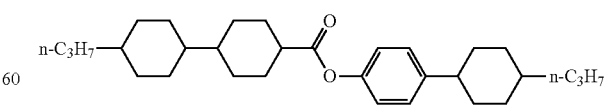

(C3e-3)
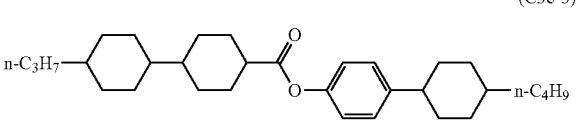

-continued (C3e-4)

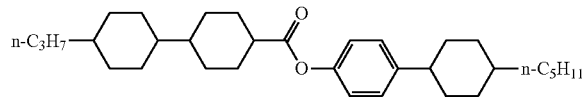

If the total content of the compounds represented by general formulae (i) and (C1) to (C3) in the liquid crystal composition of the present invention is low, the effect thereof is not provided. The lower limit in the composition is preferably 1% by mass (hereinafter, % in the composition indicates % by mass), preferably 2%, preferably 5%, preferably 7%, preferably 9%, preferably 10%, preferably 12%, preferably 15%, preferably 17%, preferably 20%. If the content is high, problems such as precipitation arise. Thus, the upper limit is preferably 50%, more preferably 40%, more preferably 30%, preferably 25%, preferably 20%, preferably 18%, preferably 15%, preferably 13%, preferably 10%.

To adjust the physical properties of the liquid crystal composition, a compound that does not have a liquid crystal phase can also be added, as needed, in addition to a compound having a liquid crystal phase.

Preferable typical examples of such a compound that can be used as a mixture with the compounds represented by general formulae (i) and (C1) to (C3) include compounds represented by general formulae (A1) to (A3) and (B1) to (B3) used in the composition provided by the present invention. At least one of the compounds is preferably contained.

Compounds represented by general formulae (A1) to (A3) are what are called fluorine-containing (halogen-containing) p-type compounds.

[Chem. 13]

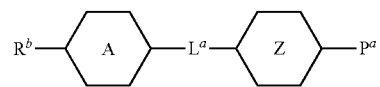
(A1)

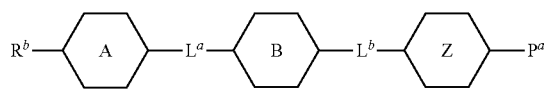
(A2)

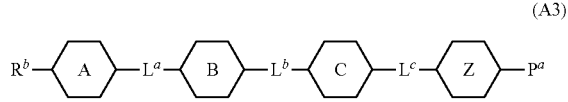
(A3)

In each of the formulae illustrated above, $R^b$ represents an alkyl group having 1 to 12 carbon atoms, may be straight-chained, may contain a methyl or ethyl branch, and may have a 3- to 6-membered ring structure, any —CH$_2$— present in the group may be replaced with —O—, —CH=CH—, —CH=CF—, —CF=CH—, —CF=CF—, or —C≡C—, any hydrogen atom present in the group may be replaced with a fluorine atom or a trifluoromethoxy group. $R^b$ preferably represents a linear alkyl group having 1 to 7 carbon atoms, a linear 1-alkenyl group having 2 to 7 carbon atoms, a linear 3-alkenyl group having 4 to 7 carbon atoms, or a alkyl group that has 1 to 5 carbon atoms and that has an end substituted with an alkoxy group having 1 to 3 carbon atoms. When an asymmetric carbon atom is present due to the branch, the compound may be optically active or a racemate.

Rings A, ring B, and ring C each independently represent a trans-1,4-cyclohexylene group, a trans-decahydronaphthalene-trans-2,6-diyl group, a 1,4-phenylene group optionally substituted with one or more fluorine atoms, a naphthalene-2,6-diyl group optionally substituted with one or more fluorine atoms, a tetrahydronaphthalene-2,6-diyl group optionally substituted with one or more fluorine atoms, a 1,4-cyclohexenylene group optionally substituted with a fluorine atom, a 1,3-dioxane-trans-2,5-diyl group, a pyrimidine-2,5-diyl group, or a pyridine-2,5-diyl group. Preferably, rings A, ring B, and ring C each independently represent a trans-1,4-cyclohexylene group, a trans-decahydronaphthalene-trans-2,6-diyl group, a naphthalene-2,6-diyl group optionally substituted with a fluorine atom, or a 1,4-phenylene group optionally substituted with one or two fluorine atoms. In particular, when ring B represents a trans-1,4-cyclohexylene group or a trans-decahydronaphthalene-trans-2,6-diyl group, ring A preferably represents a trans-1,4-cyclohexylene group. When ring C represents a trans-1,4-cyclohexylene group or a trans-decahydronaphthalene-trans-2,6-diyl group, each of rings B and A preferably represents a trans-1,4-cyclohexylene group. In (A3), ring A preferably represents a trans-1,4-cyclohexylene group.

$L^a$, $L^b$, and $L^c$ are linking groups and each independently represent a single bond, an ethylene group (—CH$_2$CH$_2$—), a 1,2-propylene group (—CH(CH$_3$)CH$_2$— or —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH—. Preferably, $L^a$, $L^b$, and $L^c$ each independently represent a single bond, an ethylene group, a 1,4-butylene group, —COO—, —OCF$_2$—, —CF$_2$O—, —CF=CF—, or —C≡C—. Particularly preferably, $L^a$, $L^b$, and $L^c$ each independently represent a single bond or an ethylene group. In (A2), at least one of $L^a$, $L^b$, and $L^c$ preferably represents a single bond. In (A3), preferably, at least two of $L^a$, $L^b$, and $L^c$ each represent a single bond.

Ring Z represents an aromatic ring and can be represented by any of general formulae (La) to (Lc):

[Chem. 14]

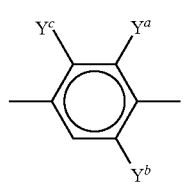
(La)

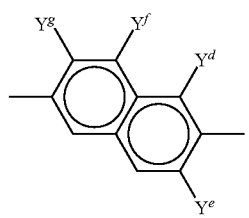
(Lb)

-continued

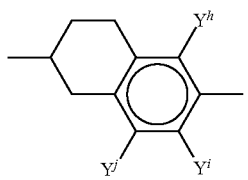
(Lc)

In the formulae, $Y^a$ to $Y^j$ each independently represent a hydrogen atom or a fluorine atom. In (La), at least one of $Y^a$ and $Y^b$ preferably represents a fluorine atom. In ($L^b$), at least one of $Y^d$ to $Y^j$ preferably represents a fluorine atom. In particular, $Y^d$ more preferably represents a fluorine atom.

Each end group $P^a$ represents a fluorine atom, a chlorine atom, a trifluoromethoxy group, a difluoromethoxy group, a trifluoromethyl group, or a difluoromethyl group, an alkoxy group, an alkyl group, an alkenyl group, or an alkenyloxy group, the alkoxy group, the alkyl group, the alkenyl group, and the alkenyloxy group having 2 or 3 carbon atoms and being substituted with two or more fluorine atoms. Each end group $P^a$ preferably represents a fluorine atom, a trifluoromethoxy group, or a difluoromethoxy group, particularly preferably a fluorine atom.

When the compounds represented by general formulae (A1) to (A3) are used in combination, identical moieties (such as ring A or $L^a$) in different molecules may represent identical substituents or different substituents.

In general formulae (A1) to (A3), general formulae (i) and (ii) of the present invention are excluded.

Preferably, the lower limit of the contents of the compounds represented by general formulae (A1) to (A3) is 1%, 2%, 5%, 8%, 10%, 13%, 15%, 18%, 20%, 22%, 25%, or 30% with respect to the total amount of the composition of the present invention. Preferably, the upper limit of the contents is 30%, 28%, 25%, 23%, 20%, 18%, 15%, 13%, 10%, 8%, or 5%.

When the composition of the present invention is required to maintain low viscosity and to have a high response speed, preferably, the lower limit is high, and the upper limit is high. When the composition of the present invention is required to maintain a high Tni and to be less likely to cause image-sticking, preferably, the lower limit is low, and the upper limit is low. When a high dielectric anisotropy is required in order to maintain a low drive voltage, preferably, the lower limit is high, and the upper limit is high.

More preferred structures of general formulae (A1) to (A3) can be represented by general formulae (A1a) to (A3c):

[Chem. 15]

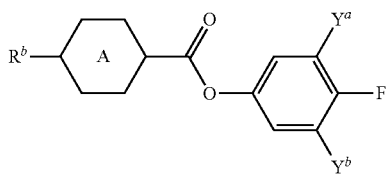
(A1a)

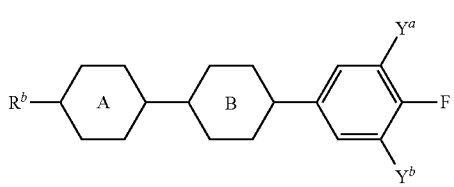
(A2a)

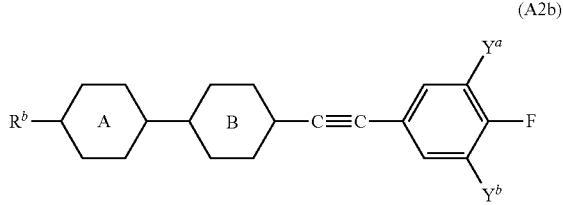
(A2b)

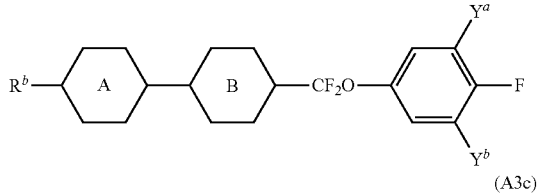
(A2c)

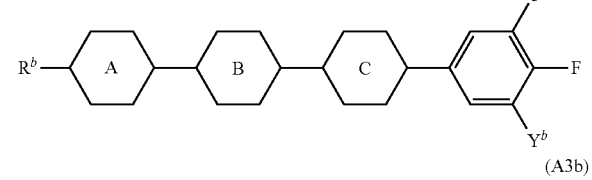
(A3c)

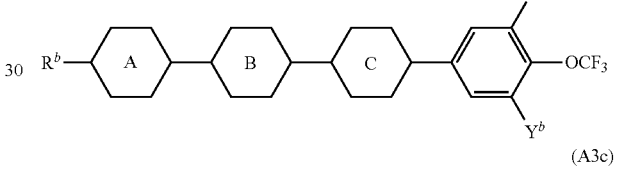
(A3b)

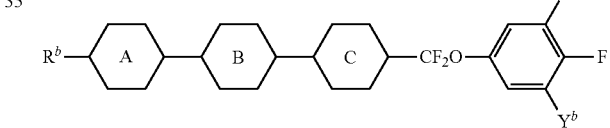
(A3c)

(where in the formulae, A, B, C, $Y^a$, and $Y^b$ represent the same meanings as A, B, C, $Y^a$, and $Y^b$ in general formulae (A1) to (A3)).

The following compounds are more preferred.

[Chem. 16]

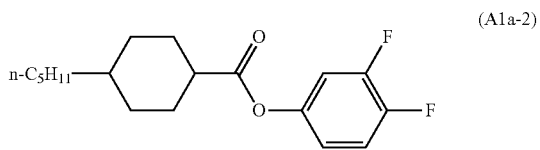
(A1a-1)

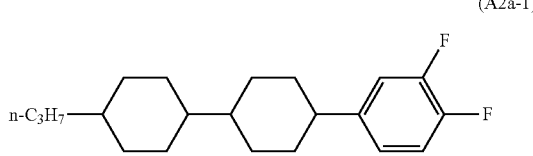
(A1a-2)

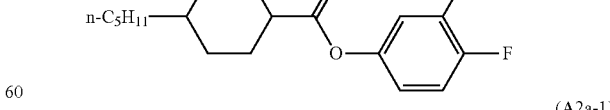
(A2a-1)

(A2a-2)
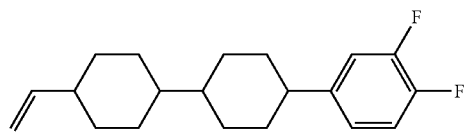
(A2b-1)
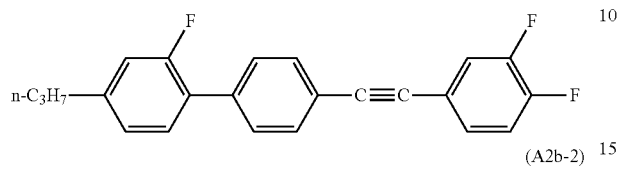
(A2b-2)
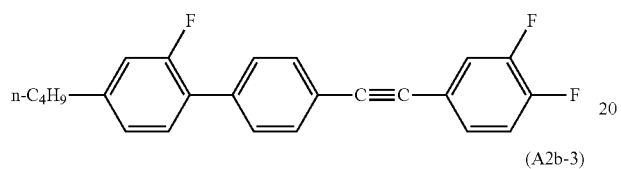
(A2b-3)
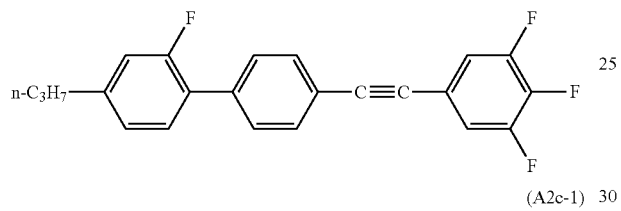
(A2c-1)
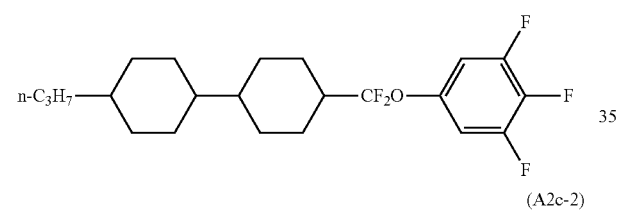
(A2c-2)
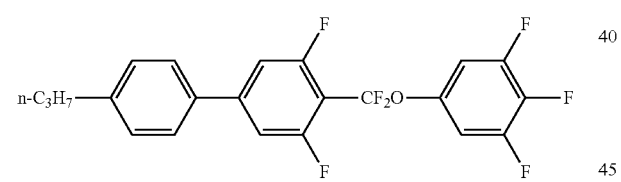
[Chem. 17]
(A3a-1)
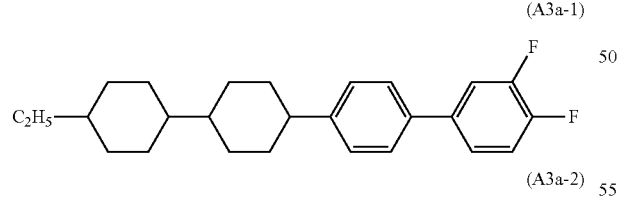
(A3a-2)
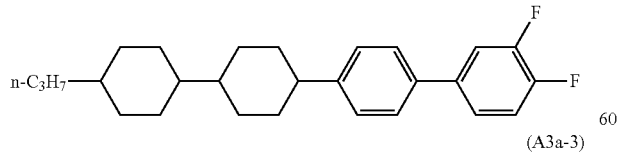
(A3a-3)
(A3a-4)
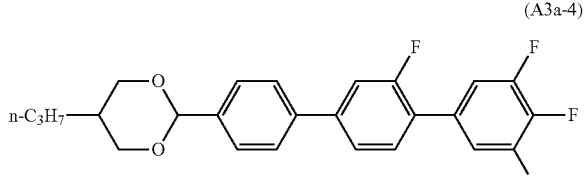
(A3b-1)
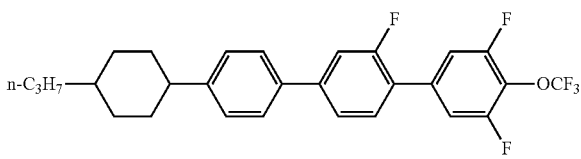
(A3c-1)
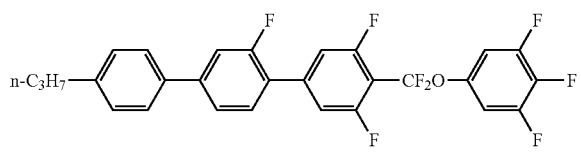
(A3c-2)
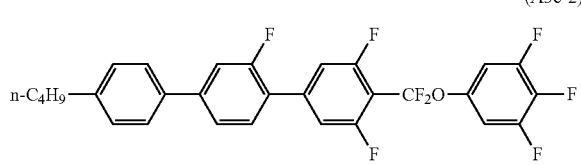
(A3c-3)
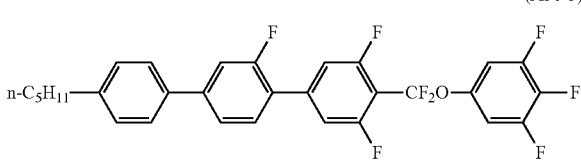
(A3c-4)
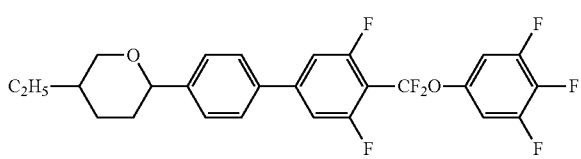
(A3c-5)
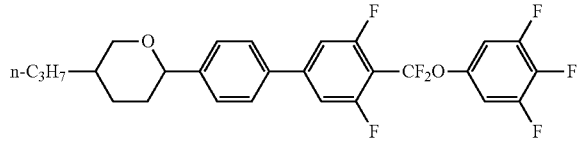
Compounds represented by general formulae (B1) to (B3) are what are called cyano-containing p-type compounds.
[Chem. 18]
(B1)
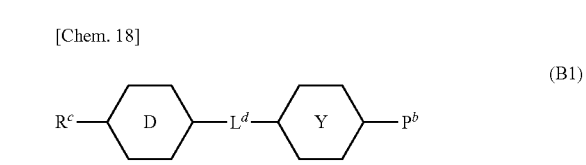
(B2)
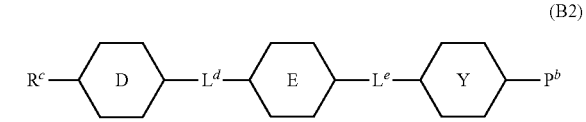

-continued

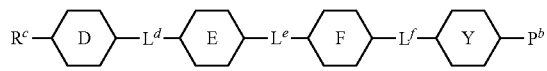
(B3)

In each of the formulae illustrated above, $R^c$ represents an alkyl group having 1 to 12 carbon atoms, may be straight-chained, may contain a methyl or ethyl branch, and may have a 3- to 6-membered ring structure. Any —CH$_2$— present in the group may be replaced with —O—, —CH=CH—, —CH=CF—, —CF=CH—, —CF=CF—, or —C≡C—. Any hydrogen atom present in the group may be replaced with a fluorine atom or a trifluoromethoxy group. $R^c$ preferably represents a linear alkyl group having 1 to 7 carbon atoms, a linear 1-alkenyl group having 2 to 7 carbon atoms, a linear 3-alkenyl group having 4 to 7 carbon atoms, or a linear alkyl group that has 1 to 5 carbon atoms and that has an end substituted with an alkoxy group having 1 to 3 carbon atoms. When an asymmetric carbon atom is present due to the branch, the compound may be optically active or a racemate.

Rings D, E, and F each independently represent a trans-1,4-cyclohexylene group, a trans-decahydronaphthalene-trans-2,6-diyl group, a 1,4-phenylene group optionally substituted with one or more fluorine atoms, a naphthalene-2,6-diyl group optionally substituted with one or more fluorine atoms, a tetrahydronaphthalene-2,6-diyl group optionally substituted with one or more fluorine atoms, a 1,4-cyclohexenylene group optionally substituted with a fluorine atom, a 1,3-dioxane-trans-2,5-diyl group, a pyrimidine-2,5-diyl group, or a pyridine-2,5-diyl group. Preferably, rings D, E, and F each independently represent a trans-1,4-cyclohexylene group, a trans-decahydronaphthalene-trans-2,6-diyl group, a naphthalene-2,6-diyl group optionally substituted with a fluorine atom, or a 1,4-phenylene group optionally substituted with one or two fluorine atoms. In particular, when ring E represents a trans-1,4-cyclohexylene group or a trans-decahydronaphthalene-trans-2,6-diyl group, ring D preferably represents a trans-1,4-cyclohexylene group. When ring F represents a trans-1,4-cyclohexylene group or a trans-decahydronaphthalene-trans-2,6-diyl group, each of rings D and E preferably represents a trans-1,4-cyclohexylene group. In (B3), ring D preferably represents a trans-1,4-cyclohexylene group.

$L^d$, $L^e$, and $L^f$ are linking groups and each independently represent a single bond, an ethylene group (—CH$_2$CH$_2$—), a 1,2-propylene group (—CH(CH$_3$)CH$_2$— or) —CH$_2$CH (CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, —OCH$_2$—, —CH$_2$O—, or —CH=NN=CH—. Preferably, $L^d$, $L^e$, and $L^f$ each independently represent a single bond, an ethylene group, —COO—, —OCF$_2$—, —CF$_2$O—, —CF=CF—, or —C≡C—. Particularly preferably, $L^d$, $L^e$, and $L^f$ each independently represent a single bond, an ethylene group, or —COO—. In (B2), at least one of $L^d$, $L^e$, and $L^f$ preferably represents a single bond. In (B3), preferably, at least two of $L^d$, $L^e$, and $L^f$ each represent a single bond.

Ring Y is an aromatic ring and can be represented by any of general formulae ($L^d$) to ($L^f$):

[Chem. 19]

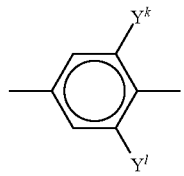
(Ld)

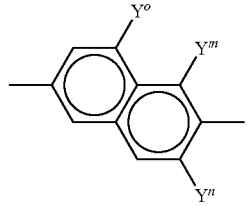
(Le)

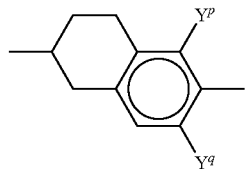
(Lf)

In the formulae, $Y^k$ to $Y^q$ each independently represent a hydrogen atom or a fluorine atom. In (Le), $Y^n$ preferably represents a fluorine atom.

Each end group $P^b$ represents a cyano group (—CN), a cyanato group (—OCN), or —C≡CCN, preferably a cyano group.

When the compounds represented by general formulae (B1) to (B3) are used in combination, identical moieties (such as ring D or $L^d$) in different molecules may represent identical substituents or different substituents.

In general formulae (B1) to (B3), general formulae (i) and (ii) of the present invention are excluded.

Preferably, the lower limit of the contents of the compounds represented by general formulae (B1) to (B3) is 1%, 2%, 5%, 8%, 10%, 13%, 15%, 18%, 20%, 22%, 25%, or 30% with respect to the total amount of the composition of the present invention. Preferably, the upper limit of the contents is 30%, 28%, 25%, 23%, 20%, 18%, 15%, 13%, 10%, 8%, or 5%.

When the composition of the present invention is required to maintain low viscosity and to have a high response speed, preferably, the lower limit is low, and the upper limit is high. When the composition of the present invention is required to maintain a high Tni and to be less likely to cause image-sticking, preferably, the lower limit is low, and the upper limit is high. When a high dielectric anisotropy is required in order to maintain a low drive voltage, preferably, the lower limit is high, and the upper limit is high.

More preferred structures of general formulae (B1) to (B3) can be represented by general formulae (B1a) to (B2c):

[Chem. 20]

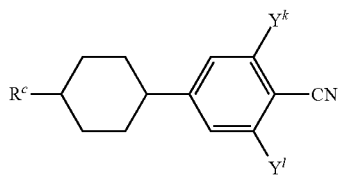
(B1a)

-continued
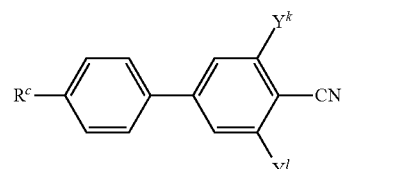
(B1b)
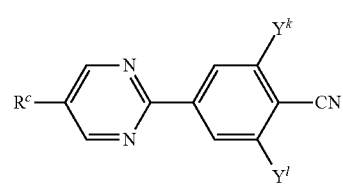
(B1c)
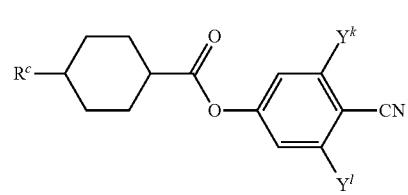
(B1d)
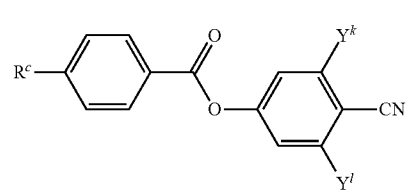
(B1e)
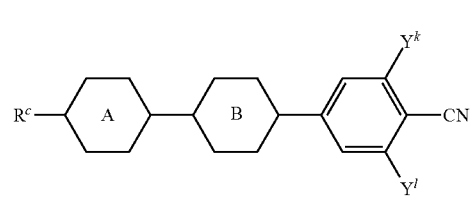
(B2a)
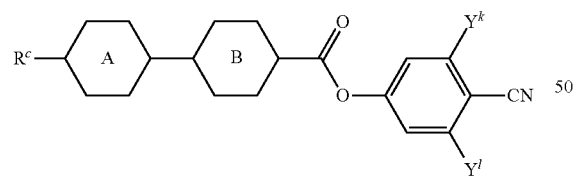
(B2b)
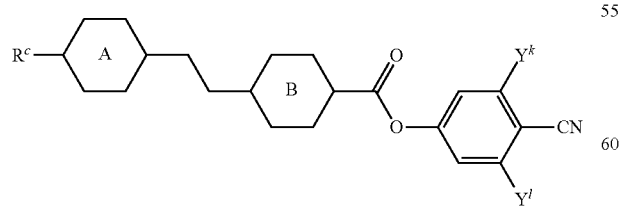
(B2c)
(where in the formulae, A, B, $Y^k$, and $Y^l$ represent the same meanings as A, B, $Y^k$, and $Y^l$ in general formulae (B1) to (B3)).
The following compounds are more preferred.
[Chem. 21]
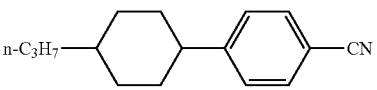
(B1a-1)
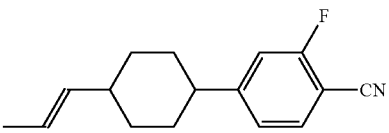
(B1a-2)
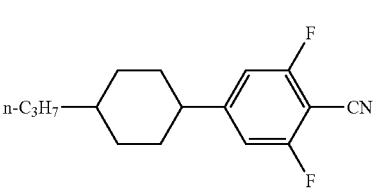
(B1a-3)
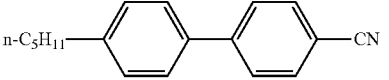
(B1b-1)
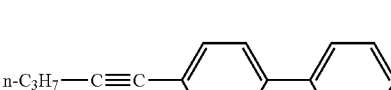
(B1b-2)
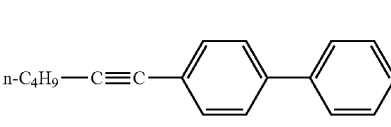
(B1b-3)
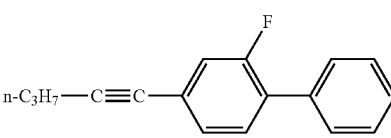
(B1b-4)
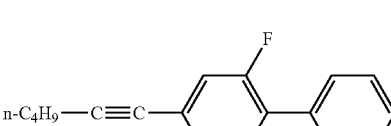
(B1b-5)
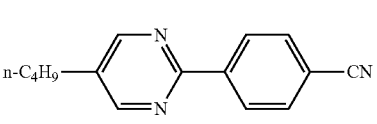
(B1c-1)
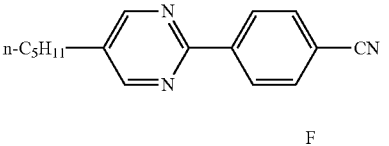
(B1c-2)
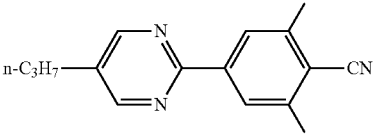
(B1c-3)

(B1d-1)
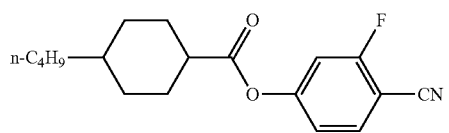

(B1d-2)
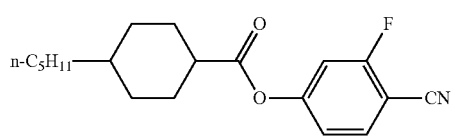

(B1e-1)
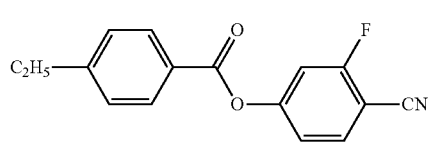

(B1e-2)
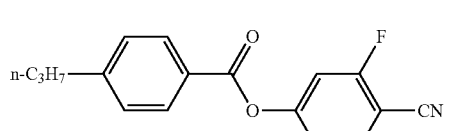

(B1e-3)
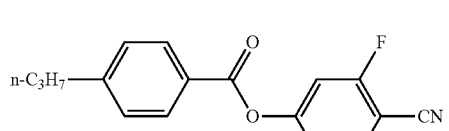

[Chem. 22]

(B2a-1)

(B2a-2)
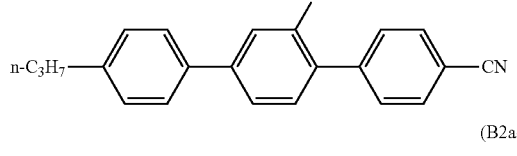

(B2a-3)
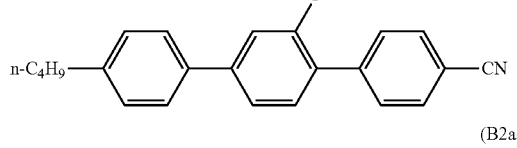

(B2a-4)
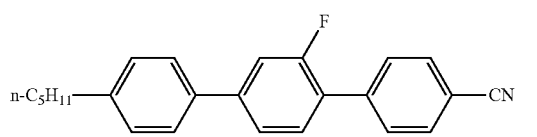

(B2a-5)
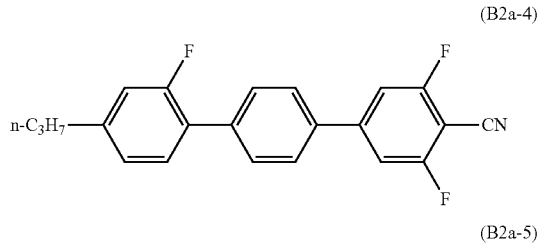

(B2b-1)

(B2b-2)

(B2b-3)

(B2c-1)
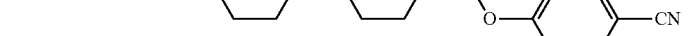

(B2c-2)

Preferably, the lower limit of the total content of the compounds represented by general formulae (i), (A1) to (A3), (B1) to (B3), and (C1) to (C3) is 80%, 85%, 88%, 90%, 92%, 93%, 94%, 95%, 96%, 97%, 98%, 99%, or 100% with respect to the total amount of the composition of the present invention. Preferably, the upper limit of the content is 100%, 99%, 98%, or 95%.

Preferably, the lower limit of the total content of the compounds represented by general formulae (i), (A1) to (A3), (B1) to (B3), and (C1) to (C3) is 80%, 85%, 88%, 90%, 92%, 93%, 94%, 95%, 96%, 97%, 98%, 99%, or 100% with respect to the total amount of the composition of the present invention. Preferably, the upper limit of the content is 100%, 99%, 98%, or 95%.

Preferably, the lower limit of the total content of the compounds represented by general formulae (i), (A1a) to (A3c), (B1a) to (B2c), and (C1a) to (C3f) is 80%, 85%, 88%, 90%, 92%, 93%, 94%, 95%, 96%, 97%, 98%, 99%, or 100% with respect to the total amount of the composition of the present invention with respect to the total amount of the composition of the present invention. Preferably, the upper limit of the content is 100%, 99%, 98%, or 95%.

Preferably, the composition of the present invention does not contain a compound having a structure, such as a peracid (—CO—OO—) structure, in which heteroatoms such as oxygen atoms are bonded together in its molecule.

When importance is placed on the reliability and the long-term stability of the composition, the content of a compound containing a carbonyl group is preferably 5% or less, more preferably 3% or less, even more preferably 1% or less, with respect to the total mass of the composition. Most preferably, substantially no compound containing a carbonyl group is contained.

When importance is placed on stability under UV irradiation, the content of a compound substituted with a chlorine atom is preferably 15% or less, preferably 10% or less, preferably 8% or less, more preferably 5% or less, preferably 3% or less, with respect to the total mass of the composition. More preferably, substantially no compound substituted with a chlorine atom is contained.

A higher content of a compound in which all ring structures in its molecule are formed of six-membered rings is preferred. The content of the compound in which all the ring structures in its molecule are formed of six-membered rings is preferably 80% or more, more preferably 90% or more, even more preferably 95% or more with respect to the total mass of the composition. Most preferably, the composition contains only the compound in which substantially all the ring structures in its molecule are six-membered rings.

To inhibit the degradation of the composition due to oxidation, a lower content of a compound having a ring structure containing a cyclohexenylene group is preferred. The content of the compound containing a cyclohexenylene group is preferably 10% or less, preferably 8% or less, more preferably 5% or less, preferably 3% or less with respect to the total mass of the composition. Even more preferably, substantially no compound containing a cyclohexenylene group is contained.

When importance is placed on improvements in viscosity and Tni, a lower content of a compound containing, in its molecule, a 2-methylbenzene-1,4-diyl group having a hydrogen atom optionally substituted with a halogen atom is preferred. The content of the compound containing the 2-methylbenzene-1,4-diyl group in its molecule is preferably 10% or less, preferably 8% or less, more preferably 5% or less, preferably 3% or less, with respect to the total mass of the composition. Even more preferably, substantially no compound containing the 2-methylbenzene-1,4-diyl group in its molecule is contained.

The expression "substantially no compound . . . is contained" in the present invention indicates that the compound is not contained, except for the compound unintentionally incorporated.

In the case where a compound contained in the composition according to a first embodiment of the present invention contains an alkenyl group serving as a side chain and where the alkenyl group is bonded to cyclohexane, the alkenyl group preferably has 2 to 5 carbon atoms. In the case where the alkenyl group is bonded to benzene, the alkenyl group preferably has 4 or 5 carbon atoms, and preferably, the unsaturated bond of the alkenyl group is not directly bonded to benzene.

To increase the stability of the liquid crystal composition of the present invention, an antioxidant is preferably added. Examples of the antioxidant include hydroquinone derivatives, nitrosamine-based polymerization inhibitors, and hindered phenol-based antioxidants. Specific examples thereof include tert-butylhydroquinone, methylhydroquinone, "Q-1300" and "Q-1301" (available from Wako Pure Chemical Industries, Ltd.); and "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", and "IRGANOX 565" (available from BASF).

The amount of the antioxidant added is preferably 0.01% to 2.0% by mass, more preferably 0.05% to 1.0% by mass with respect to a polymerizable liquid crystal composition.

To increase the stability of the liquid crystal composition of the present invention, an ultraviolet absorber is preferably added. The ultraviolet absorber preferably has a high ability to absorb ultraviolet radiation with a wavelength of 370 nm or less and preferably less absorbs visible light with a wavelength of 400 nm or more in view of good liquid crystal display characteristics. Specific examples thereof include hindered phenol-based compounds, hydroxybenzophenone-based compounds, benzotriazole-based compounds, salicylate-based compounds, benzophenone-based compounds, cyanoacrylate-based compounds, nickel complex-based compounds, and triazine-based compounds. Examples of hindered phenol-based compounds include 2,6-di-tert-butyl-p-cresol, pentaerythrityl tetrakis[3-(3,5-di-tert-butyl-4-hydroxyphenyl)propionate], N,N'-hexamethylenebis(3,5-di-tert-butyl-4-hydroxyhydrocinnamide), 1,3,5-trimethyl-2,4,6-tris(3,5-di-tert-butyl-4-hydroxybenzyl)benzene, and tris(3,5-di-tert-butyl-4-hydroxybenzyl) isocyanurate. Examples of benzotriazole-based compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethyleneglycolbis[3-(3-tert-butyl-5-methyl-4-hydroxyphenyl) propionate], N, N'-hexamethylenebis(3,5-di-tert-butyl-4-hydroxyhydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol, and pentaerythrityl tetrakis[3-(3,5-di-tert-butyl-4-hydroxyphenyl) propionate]. TINUVIN 109, TINUVIN 171, TINUVIN 326, TINUVIN 327, TINUVIN 328, TINUVIN 770, TINUVIN 900, TINUVIN 928, which are available from BASF Japan Ltd, KEMISORB 71, KEMISORB 73, and KEMISORB 74, which are available from Chemipro Kasei Kaisha Ltd., can also be preferably used.

The liquid crystal composition of the present invention can have a high Δn. Thus, when the orientation of the liquid crystal composition in a liquid crystal device is changed from the initial orientation state by, for example, an electric field, a large change in refractive index is provided. Based on this feature, the initial orientation state (with no voltage applied) in the liquid crystal device is preferably a uniaxial orientation in the liquid crystal device. Preferably, there is no strong twist that causes reflection of light in the visible light region if a twist occurs in the thickness direction of the liquid crystal device.

In the case where the liquid crystal composition of the present invention is used for a liquid crystal display device, for example, the composition is preferably used in a TN, STN, IPS, FFS, ECB, or OCB mode.

Preferred examples of other applications include liquid crystal lenses, lenticular lenses, and parallax barrier liquid crystal devices.

The compound represented by general formula (i) contains an azobenzene moiety that can be isomerized by light and thus is also preferably used for an optical switching device that controls the physical properties of a material using light.

EXAMPLES

While the present invention will be described in more detail below by examples, the present invention is not limited to these examples. In compositions of examples and comparative examples, "%" indicates "% by mass".

In the examples, the following properties are measured.
$T_{NI}$: nematic-isotropic liquid phase transition temperature
$T_{\to N}$: phase transition temperature to nematic phase
$\Delta n$: refractive index anisotropy at 298 K
$n_o$:
$\Delta_\varepsilon$: dielectric anisotropy at 298 K
$\varepsilon_\perp$:
$\gamma_1$: rotational viscosity at 298 K
$V_{the}$: voltage when transmittance of liquid crystal enclosed in
8.3-μm-thick TN cell is changed by 10% under crossed Nicols at 298 K
VHR: voltage holding ratio (%) at a frequency of 60 Hz, an applied voltage of 5 V, and a temperature of 333 K
VHR after heat resistance test: A test element group (TEG) in which composition samples were enclosed and which is used to evaluate electro-optic properties was maintained at 130° C. for 1 hour in a constant temperature oven, and then VHR was measured under the same conditions as in the foregoing method for measuring VHR.
Current Value Liquid crystal compositions were injected into respective TN liquid crystal cells (cell gap: 8.3 μm) under vacuum and then sealed with a UV-curable resin (Three Bond 3026, available from ThreeBond Co., Ltd.) to produce liquid crystal cells.

A sample in which a current value was measured immediately after the production of each liquid crystal cell was referred to as the "initial sample" (hereinafter, also abbreviated as "initial").

A sample in which each liquid crystal cell was subjected to ultraviolet irradiation for 16 hours with a Suntest (available from Original Hanau) was referred to as a UV irradiation sample (hereinafter, abbreviated as "UV").

A sample in which each liquid crystal cell was heated at 80° C. for 350 hours with an oven was referred to as a "heated sample" (hereinafter, abbreviated as "heated").

The current value was measured with a circuit illustrated in FIG. 1 by applying a rectangular wave (Vap=2.5 V) to each liquid crystal cell and observing the waveform of the voltage across a resistor with a resistance of 50 KΩ in the circuit. Vr (mV) was measured from the voltage waveform observed (FIG. 2), and the current value was calculated from Vr and the electrode area W (cm²) of the liquid crystal cell using the following formula:

$$Ir(\mu A/cm^2)=Vr/(50\times W) \quad \text{[Math. 1]}$$

Three liquid crystal cells for each composition were produced under conditions. The current values thereof were measured. The average of the current values obtained from the three cells was defined as a current value serving as a reliability index in a panel.

Image-Sticking

Evaluation of image-sticking in a liquid crystal display device was performed as follows: After a predetermined fixed pattern was displayed in a display area for a freely-selected test time, a uniform image was displayed on the entire display screen. The test time required until the afterimage of the fixed pattern reached an unacceptable afterimage level was measured.

1) The term "test time" used here refers to the time required to display the fixed pattern. A longer test time indicates that the occurrence of the afterimage is further inhibited, which indicates higher performance.

2) The term "unacceptable afterimage level" refers to a level at which an afterimage rated as fail in a pass-fail test for shipping was observed.

Example

Sample A: 1000 hours
Sample B: 500 hours
Sample C: 200 hours
Sample D: 100 hours
The level of performance: A>B>C>D
Drop Mark A drop mark in a liquid crystal display device was evaluated by visually observing a white drop mark on a display screen displaying a full-screen solid black image using the following five-grade scale.
5: No drop mark was observed (excellent)
4: Very faint drop marks were observed but were at an acceptable level (good)
3: Faint drop marks were observed and were at the borderline level of a pass-fail judgment (pass with conditions)
2: Drop marks were observed and were at an unacceptable level (fail)
1: Extensive drop marks were observed (poor)
Process Compatibility Process compatibility was evaluated by an ODF process as follows: A liquid crystal was dropped 50 pL at a time with a constant-volume pump. The total mass of the liquid crystal dropped was measured every 100 dropping operations (0 to 100th dropping operations, 101st to 200th dropping operations, 201st to 300th dropping operations, and the like). The evaluation was performed on the basis of the number of dropping operations when variations in mass reached a level inappropriate for the ODF process.

A lager number of dropping operations indicates that the liquid crystal can be stably dropped over a longer period of time and has high process compatibility.

Example

Sample A: 95,000 times
Sample B: 40,000 times
Sample C: 100,000 times
Sample D: 10,000 times
The level of performance: C>A>B>D
Low-Temperature Storage Stability Storage stability at a low temperature was evaluated as follows: After a composition was prepared, 0.5 g of the composition was weighed into a 1 mL sample container. The sample container was stored in a temperature-controlled test chamber set at −25° C. for 240 hours. The formation of precipitates was visually observed. The test time when the precipitates were observed was measured. A longer test time indicates better storage stability at a low temperature.
Volatility and Production Apparatus Contamination Property The volatility of a liquid crystal material was evaluated by visually checking the foaming of the liquid crystal material while monitoring the operation state of a vacuum stirring defoaming mixer with a stroboscope. Specifically, 0.8 kg of a composition was placed in a 2.0 L special container of the vacuum stirring defoaming mixer. The vacuum stirring defoaming mixer was operated at a revolution velocity of 15 S-1, a rotating velocity of 7.5 S-1, and a pressure of 4 kPa. The time required until the foaming started was measured.

A longer time required until the foaming starts indicates that the composition is not easily evaporated and is less likely to lead to the contamination of a production apparatus, which indicates higher performance.

Example

Sample A: 200 seconds
Sample B: 45 seconds
Sample C: 60 seconds
Sample D: 15 seconds
The level of performance: A>C>B>D In examples, compounds are designated using abbreviations described below.
(Ring Structure)

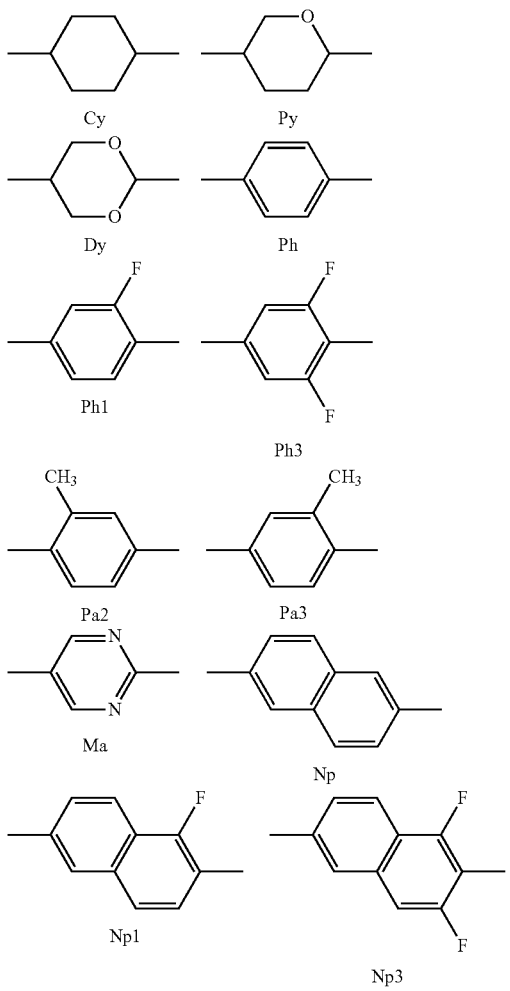

Unless otherwise specified, the moieties are in trans configuration.
(Side Chain Structure and Linking Structure)

TABLE 1

| Symbol in formula | Substituent and linking group |
|---|---|
| 1- | $CH_3$— |
| 2- | $C_2H_5$— |
| 3- | $n\text{-}C_3H_7$— |
| 4- | $n\text{-}C_4H_9$— |
| 5- | $n\text{-}C_5H_{11}$— |
| V— | $CH_2=CH$— |
| V2- | $CH_2=CH-CH_2-CH_2$— |
| 1V2- | $CH_3-CH=CH-CH_2-CH_2$— |
| -1 | —$CH_3$ |
| -2 | —$C_2H_5$ |
| -3 | —$n\text{-}C_3H_7$ |
| —O2 | —$OC_2H_5$ |
| -V0 | —$CH=CH_2$ |
| -V1 | —$CH=CH-CH_3$ |
| -2V | —$CH_2-CH_2-CH=CH_2$ |
| —F | —F |
| —OCF3 | —$OCF_3$ |
| —CN | —CN |
| — | single bond |
| -E- | —COO— |
| —CH2CH2— | —$CH_2CH_2$— |
| —CFFO— | —$CF_2O$— |
| -T- | —C≡C— |
| —O1- | —$OCH_2$— |

Examples 1 to 30

Liquid crystal compositions of the present invention and liquid crystal display devices including the liquid crystal compositions were produced, and the physical properties were measured.

As compounds represented by general formula (i), compounds represented by formulae (i-a) and (i-b) were used.

[Chem. 24]

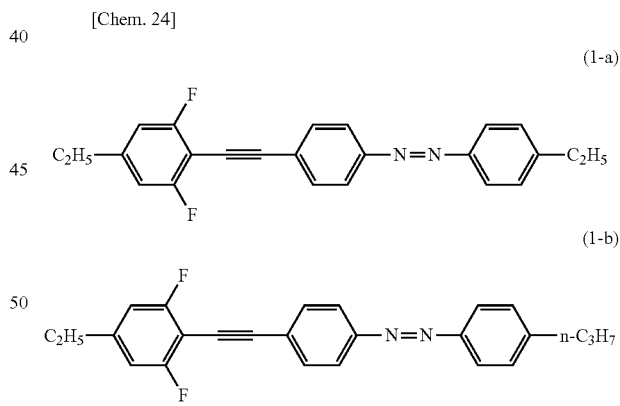

A composition of Comparative example 1 that did not contain the compound represented by general formula (i) had a significantly low Δn value, a high $T_{\to N}$, and a narrow temperature range of a nematic phase, compared with the composition of Example 1.

A composition of Comparative example 2 that did not contain the compound represented by general formula (i) was prepared on the basis of the composition of Example 2 that had a larger Δn value than the composition of Example 1. The composition of Comparative example 2 also had a significantly low Δn value, and $T_{\to N}$ deteriorated.

TABLE 2

| | Example 1 | Comparative example 1 | Example 2 | Comparative example 2 |
|---|---|---|---|---|
| $T_{NI}$ | 114.7 | 111.2 | 113.1 | 110.0 |
| $T_{\to N}$ | G-43 | G-41 | G-35 | S-25 |
| $\Delta n$ | 0.203 | 0.179 | 0.272 | 0.246 |
| $n_o$ | 1.504 | 1.503 | 1.512 | 1.514 |
| $\eta$ | 31.3 | 28.3 | 47.0 | 45.0 |
| $V_{th}$ | 1.59 | 1.60 | 1.57 | 1.60 |
| 2-Ph-E-Ph1—CN | 5 | 5 | 4 | 4 |
| 3-Ph-E-Ph1—CN | 3 | 3 | 3 | 3 |
| 4-Ph-E-Ph1—CN | 12 | 12 | 8 | 8 |
| 3-Ma-Ph3—CN | 8 | 8 | 8 | 8 |
| 5-Cy-Cy-V | 11 | 11 | | |
| V2-Ph-T-Ph—2V | 5 | 5 | 9 | 9 |
| 3-Ph-T-Ph-1 | 3 | 3 | 5 | 5 |
| 3-Ph-T-Ph—O2 | | 3 | 5 | 5 |
| 4-Ph-T-Ph—O2 | 3 | 3 | 5 | 5 |
| 5-Ph-T-Ph—O1 | | | 3 | 3 |
| 5-Ph-T-Pa2—O2 | | | 3 | 5 |
| V-Cy-Cy-Ph-1 | 7 | 7 | | |
| V2-Cy-Cy-Ph-1 | 7 | 7 | | |
| 3-Cy-Ph-T-Ph-2 | 7 | 7 | 6 | 6 |
| 4-Cy-Ph-T-Ph-1 | 7 | 7 | 5 | 5 |
| 3-Cy-Ph-T-Pa2-1 | | 2 | | 6 |
| 3-Cy-E-Ph-T-Ph-1 | 2 | 7 | 6 | 6 |
| 3-Cy-E-Ph-T-Ph-5 | | | 3 | 5 |
| 3-Ph-Ph1-Ph—CN | | | 11 | 11 |
| 3-Cy-Cy-E-Ph-Cy-3 | 5 | 5 | 3 | 3 |
| 3-Cy-Cy-E-Ph-Cy-4 | 5 | 5 | 3 | 3 |
| (i-a) | 5 | | 5 | |
| (i-b) | 5 | | 5 | |

The compositions of Examples 3 and 4 are designed to have a higher Δn and faster response.

A composition of Comparative example 3 that did not contain the compound represented by general formula (i) also had a significantly low Δn value, a high $T_{\to N}$, and a narrow temperature range of a nematic phase, compared with the composition of Example 3. Example 4 and Comparative example 4 had a similar tendency.

TABLE 3

| | Example 3 | Comparative example 3 | Example 4 | Comparative example 4 |
|---|---|---|---|---|
| $T_{NI}$ | 113.5 | 112.2 | 111.2 | 110.2 |
| $T_{\to N}$ | G-45 | S-37 | G-41 | G-36 |
| $\Delta n$ | 0.204 | 0.181 | 0.272 | 0.245 |
| $n_o$ | 1.503 | 1.501 | 1.514 | 1.513 |
| $\eta$ | 17.2 | 16.6 | 23.4 | 23.9 |
| $V_{th}$ | 2.68 | 2.74 | 2.63 | 2.79 |
| 2-Ph-E-Ph1—CN | 2 | 2 | | |
| 3-Ph-E-Ph1—CN | 2 | 2 | | |
| 3-Ma-Ph3—CN | 5 | 5 | 5 | 5 |
| 4-Ma-Ph—CN | | | 2 | 2 |
| 5-Ma-Ph—CN | | | 2 | 2 |
| 5-Cy-Cy-V | 20 | 20 | 2 | 2 |
| V2-Ph-T-Ph—2V | 7 | 7 | 14 | 14 |
| 3-Ph-T-Ph-1 | 6 | 6 | 11 | 10 |
| 3-Ph-T-Ph—O2 | 4 | 5 | 6 | 5 |
| 4-Ph-T-Ph—O2 | 4 | 5 | 6 | 6 |
| 5-Ph-T-Ph—O1 | 4 | 5 | 6 | 6 |
| 5-Ph-T-Pa2—O2 | | | 3 | 6 |
| V-Cy-Cy-Ph-1 | 7 | 7 | | |
| V2-Cy-Cy-Ph-1 | 6 | 6 | | |
| 3-Cy-Ph-T-Ph-2 | 7 | 7 | 7 | 7 |
| 4-Cy-Ph-T-Ph-1 | 6 | 6 | 7 | 7 |
| 3-Cy-Ph-T-Pa2-1 | | | | 7 |
| 3-Cy-E-Ph-T-Ph-1 | | 7 | 7 | 7 |
| 3-Cy-E-Ph-T-Ph-5 | | | 4 | 6 |
| 3-Cy-Cy-E-Ph-Cy-3 | 5 | 5 | 4 | 4 |
| 3-Cy-Cy-E-Ph-Cy-4 | 5 | 5 | 4 | 4 |
| (i-a) | 5 | | 5 | |
| (i-b) | 5 | | 5 | |

Examples 5 to 12

The physical properties of the following compositions are listed below.

TABLE 4

| | Example 5 | Example 6 | Example 7 | Example 8 |
|---|---|---|---|---|
| $T_{NI}$ | 110.4 | 110.6 | 109.9 | 109.9 |
| $T_{\to N}$ | G-31 | | G-49 | |
| $\Delta n$ | 0.180 | 0.179 | 0.248 | 0.248 |
| $n_o$ | 1.501 | | 1.513 | |
| $\eta$ | 25.1 | 26.2 | 33.6 | 33.6 |
| $V_{th}$ | 1.59 | 1.59 | 1.63 | 1.63 |
| 2-Ph-E-Ph1—CN | 5 | 4 | 5 | 5 |
| 3-Ph-E-Ph1—CN | 3.5 | 3 | 3 | 3 |
| 4-Ph-E-Ph1—CN | 13 | 11.5 | 10 | 10 |
| 3-Ma-Ph3—CN | 7 | 7 | 7 | 7 |
| 5-Cy-Cy-V | 17.5 | 13 | 2.5 | 2.5 |
| V2-Ph-T-Ph—2V | 3 | 3.5 | 14 | 14 |
| 3-Ph-T-Ph-1 | | | 10 | 10 |
| V-Cy-Cy-Ph1—F | | 15 | | |
| V-Cy-Cy-Ph-1 | 10 | 7 | | |
| V2-Cy-Cy-Ph-1 | 13 | 8 | | |
| 3-Cy-Ph-T-Ph-2 | 6 | 6 | 7 | 7 |
| 4-Cy-Ph-T-Ph-1 | 6 | 6 | 7 | 7 |
| 3-Cy-Ph-T-Pa2-1 | | | 4 | 4 |
| 3-Cy-E-Ph-T-Ph-1 | | | 7 | 7 |
| 3-Cy-E-Ph-T-Ph-5 | | | 7 | 7 |
| 3-Cy-Cy-E-Ph-Cy-3 | 3 | 3 | 3.5 | 3.5 |
| 3-Cy-Cy-E-Ph-Cy-4 | 3 | 3 | 3 | 3 |
| (i-a) | 5 | 5 | 5 | 5 |
| (i-b) | 5 | 5 | 5 | 5 |

TABLE 5

| | Example 9 | Example 10 | Example 11 | Example 12 |
|---|---|---|---|---|
| $T_{NI}$ | 110.6 | 111.2 | 111.1 | 110.7 |
| $T_{\to N}$ | G-37 | | G-44 | |
| $\Delta n$ | 0.180 | 0.179 | 0.246 | 0.245 |
| $n_o$ | 1.499 | | 1.512 | |
| $\eta$ | 14.3 | 15.2 | 19.4 | 20.6 |
| $V_{th}$ | 2.74 | 2.76 | 2.79 | 2.79 |
| 2-Ph-E-Ph1—CN | 2 | 1.5 | 2 | |
| 3-Ph-E-Ph1—CN | 1.5 | | | |
| 3-Ma-Ph3—CN | 5 | 4 | 5 | 4.5 |
| 5-Cy-Cy-V | 20 | 20 | 5.5 | 3 |
| 3-Cy-Cy-V | 6 | 2 | | |
| V2-Ph-T-Ph—2V | 9 | 9 | 14 | 14 |
| 3-Ph-T-Ph-1 | 5.5 | 6 | 10 | 10 |
| 3-Ph-T-Ph—O2 | | | 4 | 4 |
| 4-Ph-T-Ph—O2 | 2 | 2 | 6 | 6 |
| 5-Ph-T-Ph—O1 | 2 | 2 | 6 | 6 |
| V-Cy-Cy-Ph1—F | | 15 | | 15 |
| V-Cy-Cy-Ph-1 | 8 | 4 | 5 | |
| V2-Cy-Cy-Ph-1 | 12 | 7 | 7.5 | |
| 3-Cy-Ph-T-Ph-2 | 4 | 4.5 | 7 | 7 |
| 4-Cy-Ph-T-Ph-1 | 4 | 4 | 7 | 7 |
| 3-Cy-E-Ph-T-Ph-1 | | | 5 | 7 |
| 3-Cy-Cy-E-Ph-Cy-3 | 5 | 5 | 3 | 3.5 |
| 3-Cy-Cy-E-Ph-Cy-4 | 4 | 4 | 3 | 3 |
| (i-a) | 5 | 5 | 5 | 5 |
| (i-b) | 5 | 5 | 5 | 5 |

Liquid crystal lenses containing the liquid crystal compositions of Examples 1 to 12 were produced. The liquid crystal lenses had good lens characteristics.

The invention claimed is:

1. A liquid crystal composition comprising:
   at least two compounds represented by general formula (i):

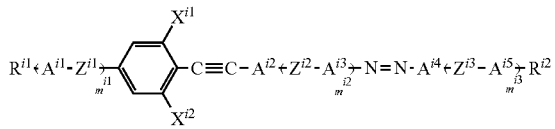

(i)

where in the formula, and $R^{i1}$ and $R^{i2}$ each independently represent a fluorine atom, a chlorine atom, a cyano group or an alkyl group having 1 to 12 carbon atoms, one —CH$_2$— group or two or more non-adjacent —CH$_2$— groups in the alkyl group are each independently optionally replaced with —CH═CH—, —C≡C—, —O—, —CO—, —COO—, or OCO—, one or two or more hydrogen atoms present in each of and $R^{i1}$ and $R^{i2}$ are each independently optionally replaced with a fluorine atom, provided that either or $R^{i1}$ and $R^{i2}$, but not both, optionally represents a substituent selected from a fluorine atom, a chlorine atom, and a cyano group, $Z^{i1}$, $Z^{i2}$, and $Z^{i3}$ each independently represent a single bond, —OCH$_2$—, —CH$_2$O—, —C$_2$H$_4$—, —C$_4$H$_8$—, —COO—, —OCO—, —CH═CH—, —CF═CF—, —CF$_2$O—, —OCF$_2$—, —CF$_2$CF$_2$—, or —C≡C—, $A^{i1}$, $A^{i2}$, $A^{i3}$, $A^{i4}$, and $A^{i5}$ each independently represent a 1,4-cyclohexylene group, a 1,4-phenylene group, a naphthalene-1,4-diyl group, or a naphthalene-2,6-diyl group, one or two or more hydrogen atoms in $A^{i1}$, $A^{i2}$, $A^{i3}$, $A^{i4}$ and $A^{i5}$ are each independently optionally replaced with a halogen atom or a cyano group, one or more non-adjacent —CH═ groups in $A^{i1}$, $A^{i2}$, $A^{i3}$, $A^{i4}$ and $A^{i5}$ are optionally replaced with —N═, $X^{i1}$ and $X^{i2}$ each independently represent a hydrogen atom or a fluorine atom, and $m^{i1}$, $m^{i2}$, and $m^{i3}$ each independently represent 0 or 1, provided that $m^{i1}+m^{i2}+m^{i3}$ is 0 or 1; and at least one compound represented by general formulae (C1c), and at least one compound represented by general formulae (C2d):

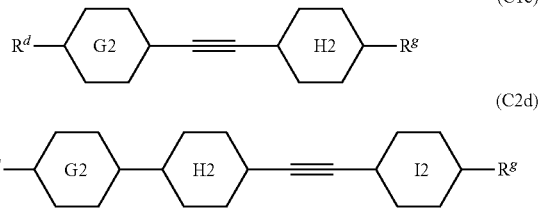

(C1c)

(C2d)

where in the formulae, $R^f$ and $R^g$ each independently represent a linear alkyl group having 1 to 7 carbon atoms, a linear 1-alkenyl group having 2 to 7 carbon atoms, a linear 3-alkenyl group having 4 to 7 carbon atoms, a linear alkoxy group having 1 to 3 carbon atoms, or a linear alkyl group that has 1 to 5 carbon atoms and that has an end substituted with an alkoxy group having 1 to 3 carbon atoms, wherein at least one of $R^f$ and $R^g$ represents a linear alkyl group having 1 to 7 carbon atoms, a linear 1-alkenyl group having 2 to 7 carbon atoms, or a linear 3-alkenyl group having 4 to 7 carbon atoms, rings G2, H2 and I2 each independently represent a trans-1,4-cyclohexylene group, a trans-decahydronaphthalene-trans-2,6-diyl group, a 1,4-phenylene group optionally substituted with one or two fluorine atoms or a methyl group, a naphthalene-2,6-diyl group optionally substituted with one or more fluorine atoms, or a tetrahydronaphthalene-2,6-diyl group optionally substituted with one or two fluorine atoms, wherein when ring G2 represent aromatic rings, a 1-alkenyl group and an alkoxy group are excluded from $R^f$, and when ring H2 represent aromatic rings, a 1-alkenyl group and an alkoxy group are excluded from $R^g$, the total content of the compound according to general formulae (C1c) and the general formulae (C2d) is 2% or more and 60% or less with respect to all compounds in the liquid crystal composition, and the liquid crystal composition has a refractive index anisotropy of 0.179 or more.

2. The liquid crystal composition according to claim 1, wherein in general formula (i), and $R^{i1}$ and $R^{i2}$ each independently represent an alkyl group having 1 to 12 carbon atoms.

3. The liquid crystal composition according to claim 1, wherein in general formula (i), $A^{i1}$, $A^{i2}$, $A^{i3}$, $A^{i4}$, and $A^{i5}$ each independently represent an unsubstituted 1,4-phenylene group, or $A^{i1}$, $A^{i2}$, $A^{i3}$, $A^{i4}$, and $A^{i5}$ each independently represent a 1,4-phenylene group in which one or two or more hydrogen atoms in $A^{i1}$, $A^{i2}$, $A^{i3}$, $A^{i4}$, and $A^{i5}$ are optionally replaced with fluorine atoms.

4. The liquid crystal composition according to claim 1, wherein in general formula (i), $m^{i1}$, $m^{i2}$, and $m^{i3}$ each represent 0.

5. The liquid crystal composition according to claim 1, further comprising:

one or two or more compounds represented by general formulae (A1) to (A3):

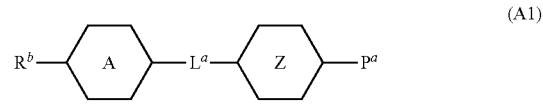

(A1)

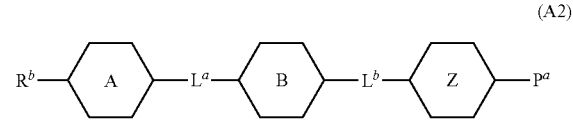

(A2)

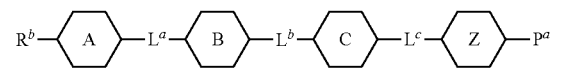

(A3)

where in the formulae, $R^b$ represents an alkyl group having 1 to 12 carbon atoms, is optionally straight-chained, optionally contains a methyl or ethyl branch, and optionally has a 3-to 6-membered ring structure, any —CH$_2$— present in the group is optionally replaced with —O—, —CH═CH—, —CH═CF—, —CF═CH—, —CF═CF—, or —CC—, or any hydrogen atom present in the group is optionally replaced with a fluorine atom or a trifluoromethoxy group, when an asymmetric carbon atom is present due to the branch, the compound is optionally optically active or a racemate, ring A, ring B, and ring C each independently represent a trans-1,4-cyclohexylene group, a trans-decahydronaphthalene-trans-2,6-diyl group, a 1,4-phenylene group optionally substituted with one or more fluorine atoms, a naphthalene-2,6-diyl group optionally substituted with one or more fluorine atoms, a tetrahydronaphthalene-2,6-diyl group optionally substituted with one or more fluorine atoms, a 1,4-cyclohexenylene group optionally substituted with a fluorine atom, a 1,3-dioxane-trans-2,5-diyl group, a pyrimidine-2,5-diyl group, or a pyridine-2,5-diyl group, $L^a$, $L^b$, and $L^c$ each independently represent a single bond, an ethylene group (—CH$_2$CH$_2$—), a 1,2-propylene group (—CH(CH$_3$)CH$_2$— or —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH—, ring Z represents a substituent represented by any of general formulae (La) to (Lc):

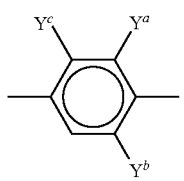

(La)

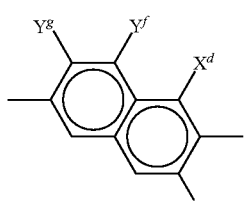

(Lb)

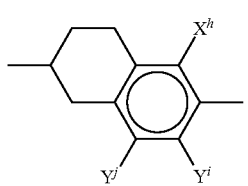

(Lc)

where in the formulae, $Y^a$ to $Y_j$ each independently represent a hydrogen atom or a fluorine atom, $P^a$ represents a fluorine atom, a chlorine atom, a trifluoromethoxy group, a difluoromethoxy group, a trifluoromethyl group, a difluoromethyl group, an alkoxy group, an alkyl group, an alkenyl group, or an alkenyloxy group, the alkoxy group, the alkyl group, the alkenyl group, and the alkenyloxy group having 2 or 3 carbon atoms and being substituted with two or more fluorine atoms, and when the compounds represented by general formulae (A1) to (A3) are used in combination, identical moieties, such as ring A or $L^a$, in different molecules optionally represent identical substituents or different substituents.

6. The liquid crystal composition according to claim 1, further comprising:

one or two or more compounds represented by general formulae (B1) to (B3):

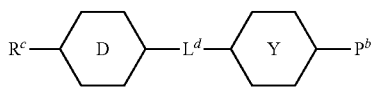

(B1)

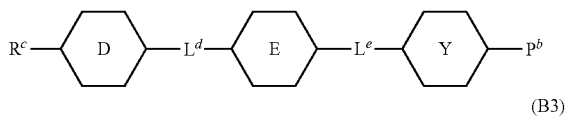

(B2)

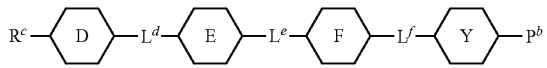

(B3)

where in the formulae, $R^c$ represents an alkyl group having 1 to 12 carbon atoms, is optionally straight-chained, optionally contain a methyl or ethyl branch, and optionally have a 3- to 6-membered ring structure, any —CH$_2$— present in the group is optionally replaced with —O—, —CH=CH—, —CH=CF—, —CF=CH—, —CF=CF—, or —C≡C—, or any hydrogen atom present in the group is optionally replaced with a fluorine atom or a trifluoromethoxy group, when an asymmetric carbon atom is present due to the branch, the compound is optionally optically active or a racemate, ring D, ring E, and ring F each independently represent a trans-1,4-cyclohexylene group, a trans-decahydronaphthalene-trans-2,6-diyl group, a 1,4-phenylene group optionally substituted with one or more fluorine atoms, a naphthalene-2,6-diyl group optionally substituted with one or more fluorine atoms, a tetrahydronaphthalene-2,6-diyl group optionally substituted with one or more fluorine atoms, a 1,4-cyclohexenylene group optionally substituted with a fluorine atom, a 1,3-dioxane-trans-2,5-diyl group, a pyrimidine-2,5-diyl group, or a pyridine-2,5-diyl group, $L^d$, $L^e$, and $L^f$ each independently represent a single bond, an ethylene group, —CH$_2$CH$_2$—, a 1,2-propylene group —CH(CH$_3$)CH$_2$— or —CH$_2$CH(CH$_3$)—, a 1,4-butylene group, —COO—, —OCO—, —OCF$_2$—, —CF$_2$O—, —CH=CH—, —CH=CF—, —CF=CH—, —CF=CF—, —C≡C—, —OCH$_2$—, —CH$_2$O—, or —CH=NN=CH—, ring Y represents an aromatic ring and a substituent represented by any of general formulae (Ld) to (Lf):

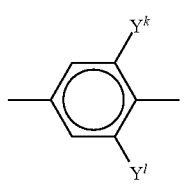

(Ld)

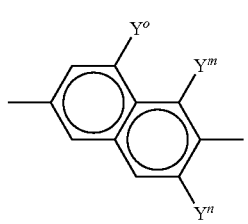

(Le)

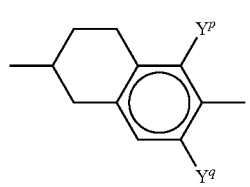 (Lf)

where in the formulae, $Y^k$ to $Y^q$ each independently represent a hydrogen atom or a fluorine atom, each end group $P^b$ represents a cyano group, group —CN, a cyanato group (—OCN), or —C≡CCN, and when the compounds represented by general formulae (B1) to (B3) are used in combination, identical moieties, such as ring D or $L^d$, in different molecules optionally represent identical substituents or different substituents.

7. The liquid crystal composition according to claim 1, further comprising at least one or two or more components selected from antioxidants, ultraviolet protective agents, chiral agents, antistatic agents, and dichroic dyes.

8. A liquid crystal display device comprising the liquid crystal composition according to claim 1.

9. A liquid crystal lens comprising the liquid crystal composition according to claim 1.

10. A birefringent lens for displaying a stereoscopic image, comprising the liquid crystal composition according to claim 1.

* * * * *